United States Patent
Nakano et al.

(10) Patent No.: US 11,033,974 B2
(45) Date of Patent: Jun. 15, 2021

(54) GEAR MACHINING APPARATUS AND GEAR MACHINING METHOD

(71) Applicant: JTEKT Corporation, Osaka (JP)

(72) Inventors: Hiroyuki Nakano, Tokai (JP); Hisashi Otani, Anjo (JP); Shuntaro Takasu, Hekinan (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 16/571,410

(22) Filed: Sep. 16, 2019

(65) Prior Publication Data

US 2020/0086409 A1 Mar. 19, 2020

(30) Foreign Application Priority Data

Sep. 18, 2018 (JP) .............................. JP2018-173215

(51) Int. Cl.
*B23F 5/12* (2006.01)
(52) U.S. Cl.
CPC ...................................... *B23F 5/12* (2013.01)
(58) Field of Classification Search
CPC ............... B23F 5/12; B23F 5/163; B23F 5/16
See application file for complete search history.

(56) References Cited

U.S. PATENT DOCUMENTS

2018/0126472 A1 5/2018 Zhang et al.

FOREIGN PATENT DOCUMENTS

| JP | 06-061340 U | 8/1994 |
| JP | 2005-152940 A | 6/2005 |
| JP | 2018-079558 A | 5/2018 |

*Primary Examiner* — Alan Snyder
(74) *Attorney, Agent, or Firm* — Oblon, McClelland, Maier & Neustadt, L.L.P.

(57) ABSTRACT

A gear machining apparatus and a gear machining method are provided. The gear machining apparatus performs cutting work for a workpiece and generates a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece. The gear machining apparatus sets a correction angle to a first angle when cutting work for a second tooth flank is started after cutting work for a first tooth flank is finished, and moves the gear cutter from a first finish position to a second start position while rotating the workpiece and the gear cutter.

10 Claims, 22 Drawing Sheets

GEAR MACHINING APPARATUS AND GEAR MACHINING METHOD

INCORPORATION BY REFERENCE

The disclosure of Japanese Patent Application No. 2018-173215 filed on Sep. 18, 2018 including the specification, drawings and abstract, is incorporated herein by reference in its entirety.

BACKGROUND OF THE INVENTION

1. Field of the Invention

The present invention relates to a gear machining apparatus and a gear machining method for machining a gear by cutting work through synchronous rotation of a machining tool and a workpiece.

2. Description of the Related Art

A synchromesh mechanism is provided in a transmission for use in a vehicle in order to achieve a smooth shifting operation. As illustrated in FIG. 12, a key type synchromesh mechanism 110 includes a main shaft 111, main drive shafts 112, a clutch hub 113, keys 114, a sleeve 115, main drive gears 116, clutch gears 117, and synchronizer rings 118. The main drive gears 116, the clutch gears 117, and the synchronizer rings 118 are arranged on respective sides of the sleeve 115.

The main shaft 111 and the main drive shafts 112 are arranged coaxially. The clutch hub 113 is spline-fitted to the main shaft 111. The main shaft 111 and the clutch hub 113 rotate together. The keys 114 are supported by springs (not illustrated) at three positions on the outer periphery of the clutch hub 113. Internal teeth (splines) 115a are formed on the inner periphery of the sleeve 115. The sleeve 115 slides in a direction of a rotation axis LL together with the keys 114 along splines (not illustrated) formed on the outer periphery of the clutch hub 113.

The main drive gears 116 are fitted to the main drive shaft 112. The clutch gear 117 is integrally formed on the sleeve 115 side of each of the main drive gears 116. A tapered cone 117b protrudes from the clutch gear 117. The synchronizer ring 118 is arranged between the sleeve 115 and the clutch gear 117. External teeth 117a of the clutch gear 117 and external teeth 118a of the synchronizer ring 118 are formed so as to be meshable with the internal teeth 115a of the sleeve 115. The inner periphery of the synchronizer ring 118 is tapered so as to be brought into friction engagement with the outer periphery of the tapered cone 117b.

Next, description is given of a case where the synchromesh mechanism 110 operates leftward in FIG. 12. The same applies to a case where the synchromesh mechanism 110 operates rightward in FIG. 12. As illustrated in FIG. 13A, the sleeve 115 and the keys 114 move in the direction of the rotation axis LL as indicated by an illustrated arrow through an operation of a shift lever (not illustrated). The keys 114 push the synchronizer ring 118 in the direction of the rotation axis LL to press the inner periphery of the synchronizer ring 118 against the outer periphery of the tapered cone 117b. Thus, the clutch gear 117, the synchronizer ring 118, and the sleeve 115 start to rotate synchronously.

As illustrated in FIG. 13B, the keys 114 are pushed downward by the sleeve 115 to further press the synchronizer ring 118 in the direction of the rotation axis LL. Therefore, the degree of close contact between the inner periphery of the synchronizer ring 118 and the outer periphery of the tapered cone 117b increases to generate a great friction force, thereby causing the clutch gear 117, the synchronizer ring 118, and the sleeve 115 to rotate synchronously. When the number of revolutions of the clutch gear 117 is completely synchronized with the number of revolutions of the sleeve 115, the friction force between the inner periphery of the synchronizer ring 118 and the outer periphery of the tapered cone 117b disappears.

When the sleeve 115 and the keys 114 further move in the direction of the rotation axis LL as indicated by the illustrated arrow, the keys 114 stop by being fitted to grooves 118b of the synchronizer ring 118, but the sleeve 115 moves beyond protrusions 114a of the keys 114. Therefore, the internal teeth 115a of the sleeve 115 mesh with the external teeth 118a of the synchronizer ring 118.

As illustrated in FIG. 13C, the sleeve 115 further moves in the direction of the rotation axis LL as indicated by the illustrated arrow, and the internal teeth 115a of the sleeve 115 mesh with the external teeth 117a of the clutch gear 117. Thus, shifting is completed. The synchromesh mechanism 110 described above is provided with gear slip preventing portions 120F and 120B configured to prevent gear slip between the external teeth 117a of the clutch gear 117 and the internal teeth 115a of the sleeve 115 during traveling.

Specifically, as illustrated in FIG. 14 and FIG. 15, the tapered gear slip preventing portions 120F and 120B are provided on one side of each internal tooth 115a of the sleeve 115 in the direction of the rotation axis LL of the sleeve 115 (hereinafter referred to simply as one rotation axis side Df) and the other side of each internal tooth 115a of the sleeve 115 in the direction of the rotation axis LL of the sleeve 115 (hereinafter referred to simply as the other rotation axis side Db), respectively. A tapered gear slip preventing portion 117c to be taper-fitted to the gear slip preventing portions 120F and 120B is provided on each external tooth 117a of the clutch gear 117.

In FIG. 15, the external tooth 117a of the clutch gear 117 is illustrated on the gear slip preventing portion 120F side alone. The gear slip preventing portions 120F and 120B of this example are formed symmetrically about an imaginary point at the center of the top land of the internal tooth 115a in the direction of the rotation axis LL of the sleeve 115. In the following description, the face of the internal tooth 115a of the sleeve 115 on the right in FIG. 12 is referred to as a "right face 115B", and the face of the internal tooth 115a of the sleeve 115 on the left is referred to as a "left face 115A".

The right face 115B includes a right tooth flank 115c, a right front tapered tooth flank 122f, a right front subordinate tooth flank 122af, a right back tapered tooth flank 122b, and a right back subordinate tooth flank 122ab. The right front tapered tooth flank 122f is provided on the one rotation axis side Df of the right tooth flank 115c. The right front subordinate tooth flank 122af is provided between the right tooth flank 115c and the right front tapered tooth flank 122f. The right back tapered tooth flank 122b is provided on the other rotation axis side Db of the right tooth flank 115c. The right back subordinate tooth flank 122ab is provided between the right tooth flank 115c and the right back tapered tooth flank 122b.

The right front tapered tooth flank 122f and the right back tapered tooth flank 122b have helix angles different from that of the right tooth flank 115c. The right front subordinate tooth flank 122af is continuous with the right tooth flank 115c and the right front tapered tooth flank 122f. The helix angle of the right front subordinate tooth flank 122af is different from those of the right tooth flank 115c and the right front tapered tooth flank 122f. Similarly, the right back subordinate tooth flank 122ab is continuous with the right tooth flank 115c and the right back tapered tooth flank 122b. The helix angle of the right back subordinate tooth flank 122ab is different from those of the right tooth flank 115c and the right back tapered tooth flank 122b.

Similarly, the left face 115A includes a left tooth flank 115b, a left front tapered tooth flank 121f, a left front subordinate tooth flank 121af, a left back tapered tooth flank 121b, and a left back subordinate tooth flank 121ab. The left front tapered tooth flank 121f is provided on the one rotation axis side Df of the left tooth flank 115b. The left front subordinate tooth flank 121af is provided between the left tooth flank 115b and the left front tapered tooth flank 121f. The left back tapered tooth flank 121b is provided on the other rotation axis side Db of the left tooth flank 115b. The left back subordinate tooth flank 121ab is provided between the left tooth flank 115b and the left back tapered tooth flank 121b.

The left front tapered tooth flank 121f and the left back tapered tooth flank 121b have helix angles different from that of the left tooth flank 115b. The left front subordinate tooth flank 121af is continuous with the left tooth flank 115b and the left front tapered tooth flank 121f. The helix angle of the left front subordinate tooth flank 121af is different from those of the left tooth flank 115b and the left front tapered tooth flank 121f. Similarly, the left back subordinate tooth flank 12 1ab is continuous with the left tooth flank 115b and the left back tapered tooth flank 121b. The helix angle of the left back subordinate tooth flank 121ab is different from those of the left tooth flank 115b and the left back tapered tooth flank 121b.

As illustrated in FIG. 16 and FIG. 17, the sleeve 115 may have a left front chamfered tooth flank 131f formed at the end of the left front tapered tooth flank 121f on the one rotation axis side Df and having a helix angle different from those of the left tooth flank 115b and the left front tapered tooth flank 121f In this case, the left front chamfered tooth flank 131f having a helix angle different from those of the left tooth flank 115b and the left front tapered tooth flank 121f is formed at the end of the left front tapered tooth flank 121f on the one rotation axis side Df, and a left back chamfered tooth flank 131b having a helix angle different from those of the left tooth flank 115b and the left back tapered tooth flank 121b is formed at the end of the left back tapered tooth flank 121b on the other rotation axis side Db. Similarly, a right front chamfered tooth flank 132f having a helix angle different from those of the right tooth flank 115c and the right front tapered tooth flank 122f is formed at the end of the right front tapered tooth flank 122f on the one rotation axis side Df, and a right back chamfered tooth flank 132b having a helix angle different from those of the right tooth flank 115c and the right back tapered tooth flank 122b is formed at the end of the right back tapered tooth flank 122b on the other rotation axis side Db.

The right front tapered tooth flank 122f, the right front subordinate tooth flank 122af, and the right front chamfered tooth flank 132f and the left front tapered tooth flank 121f, the left front subordinate tooth flank 121af, and the left front chamfered tooth flank 131f constitute the gear slip preventing portion 120F. Similarly, the right back tapered tooth flank 122b, the right back subordinate tooth flank 122ab, and the right back chamfered tooth flank 132b and the left back tapered tooth flank 121b, the left back subordinate tooth flank 12 1ab, and the left back chamfered tooth flank 131b constitute the gear slip preventing portion 120B. For example, the gear slip is prevented by taper-fitting the left front tapered tooth flank 121f to the gear slip preventing portion 117c.

As described above, the structure of the internal tooth 115a of the sleeve 115 is complicated. The sleeve 115 is a component that needs to be manufactured by mass production. Therefore, the internal teeth 115a of the sleeve 115 are generally formed by broaching or gear shaping, and the gear slip preventing portions 120F and 120B are generally formed by form rolling (see Japanese Unexamined Utility Model Application Publication No. 6-61340 (JP 6-61340 U) and Japanese Unexamined Patent Application Publication No. 2005-152940 (JP 2005-152940 A)). However, form rolling is plastic working, and the machining accuracy tends to decrease. In order to increase the machining accuracy, cutting work is desirable. Japanese Unexamined Patent Application Publication No. 2018-79558 (JP 2018-79558 A) discloses a technology for forming the gear slip preventing portion by cutting work.

For example, in a case of forming the gear slip preventing portion 120F by cutting work using the technology described in JP 2018-79558 A, it is necessary that the phase and posture of a tool with respect to those of a workpiece be set again when the right front chamfered tooth flank 132f (left front chamfered tooth flank 131f) is formed after the cutting work for the right front tapered tooth flank 122f (left front tapered tooth flank 121f). If the rotation of the workpiece and the rotation of the tool are stopped to adjust the phase, the time from the finish of cutting work for the right front tapered tooth flank 122f (left front tapered tooth flank 121f) to the start of cutting work for the right front chamfered tooth flank 132f (left front chamfered tooth flank 131f) increases. Thus, the cycle time increases.

SUMMARY OF THE INVENTION

It is one object of the present invention to provide a gear machining apparatus and a gear machining method in which a cycle time can be reduced when a plurality of tooth flanks having different helix angles are formed on the faces of teeth of a gear by cutting work.

A gear machining apparatus according to one aspect of the present invention is a gear machining apparatus configured to perform cutting work for a workpiece and generate a gear by performing a feed operation of a gear cutter relative to the workpiece along a direction of the axis of the workpiece while synchronously rotating the gear cutter and the workpiece in a state in which an axis of the gear cutter is inclined with respect to a line parallel to the axis of the workpiece. The gear has a plurality of teeth each having one face including a first tooth flank, and a second tooth flank having a helix angle different from a helix angle of the first tooth flank. The gear machining apparatus includes a machining control unit configured to control rotation of the workpiece and rotation of the gear cutter, and control the feed operation of the gear cutter relative to the workpiece.

A start position of the feed operation when the first tooth flank is formed is defined as a first start position, a finish position of the feed operation when the first tooth flank is formed is defined as a first finish position, and a start position of the feed operation when the second tooth flank is formed is defined as a second start position. A position where the gear cutter cuts the one face is defined as a cutting point, the cutting point when the cutting work is started is defined as a start point, and the cutting point when the gear cutter is fed by a predetermined feed amount from the start point is defined as a movement point. The cutting point when the gear cutter is fed by the predetermined feed amount from the start point while the workpiece and the gear cutter rotate in a predetermined reference synchronous rotation state is defined as a reference movement point. A phase shift angle to one side in a circumferential direction of the workpiece, which is set to shift a phase of the movement point from a phase of the reference movement point when the gear cutter is fed by the predetermined feed amount from the start point, is defined as a correction angle.

A phase shift angle of the second start position from the first finish position to the one side in the circumferential direction of the workpiece is defined as a first angle. The machining control unit is configured to set the correction angle to the first angle when the cutting work for the second tooth flank is started after the cutting work for the first tooth flank is finished, and move the gear cutter from the first finish position to the second start position while rotating the workpiece and the gear cutter.

A gear machining method according to another aspect of the present invention is a gear machining method for performing cutting work for a workpiece and generating a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece. The gear has a plurality of teeth each having one face including a first tooth flank, and a second tooth flank having a helix angle different from a helix angle of the first tooth flank.

A start position of the feed operation when the first tooth flank is formed is defined as a first start position, a finish position of the feed operation when the first tooth flank is formed is defined as a first finish position, and a start position of the feed operation when the second tooth flank is formed is defined as a second start position. A position where the gear cutter cuts the one face is defined as a cutting point, the cutting point when the cutting work is started is defined as a start point, and the cutting point when the gear cutter is fed by a predetermined feed amount from the start point is defined as a movement point. The cutting point when the gear cutter is fed by the predetermined feed amount from the start point while the workpiece and the gear cutter rotate in a predetermined reference synchronous rotation state is defined as a reference movement point. A phase shift angle to one side in a circumferential direction of the workpiece, which is set to shift a phase of the movement point from a phase of the reference movement point when the gear cutter is fed by the predetermined feed amount from the start point, is defined as a correction angle.

A phase shift angle of the second start position from the first finish position to the one side in the circumferential direction of the workpiece is defined as a first angle. The gear machining method includes setting the correction angle to the first angle when the cutting work for the second tooth flank is started after the cutting work for the first tooth flank is finished, and moving the gear cutter from the first finish position to the second start position while rotating the workpiece and the gear cutter.

According to the gear machining apparatus and the gear machining method of the aspects described above, the machining control unit sets the correction angle to the first angle when the cutting work for the second tooth flank is started after the cutting work for the first tooth flank is finished. Then, the machining control unit moves the gear cutter from the first finish position to the second start position while rotating the workpiece and the gear cutter. That is, the gear machining apparatus assumes the first angle as the correction angle, and can adjust the phase shift of the second start position from the first finish position while keeping the state in which the workpiece and the gear cutter rotate when the gear cutter is fed from the first finish position to the second start position. According to the gear machining apparatus and the gear machining method of the aspects described above, it is possible to reduce the time required from the finish of the cutting work for the first tooth flank to the start of the cutting work for the second tooth flank. Accordingly, the cycle time can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A gear machining apparatus and a gear machining method according to embodiments of the present invention are described below with reference to the drawings. First, the overall structure of a gear machining apparatus 1 according to one embodiment of the present invention is described with reference to FIG. 1.

Figure 1:
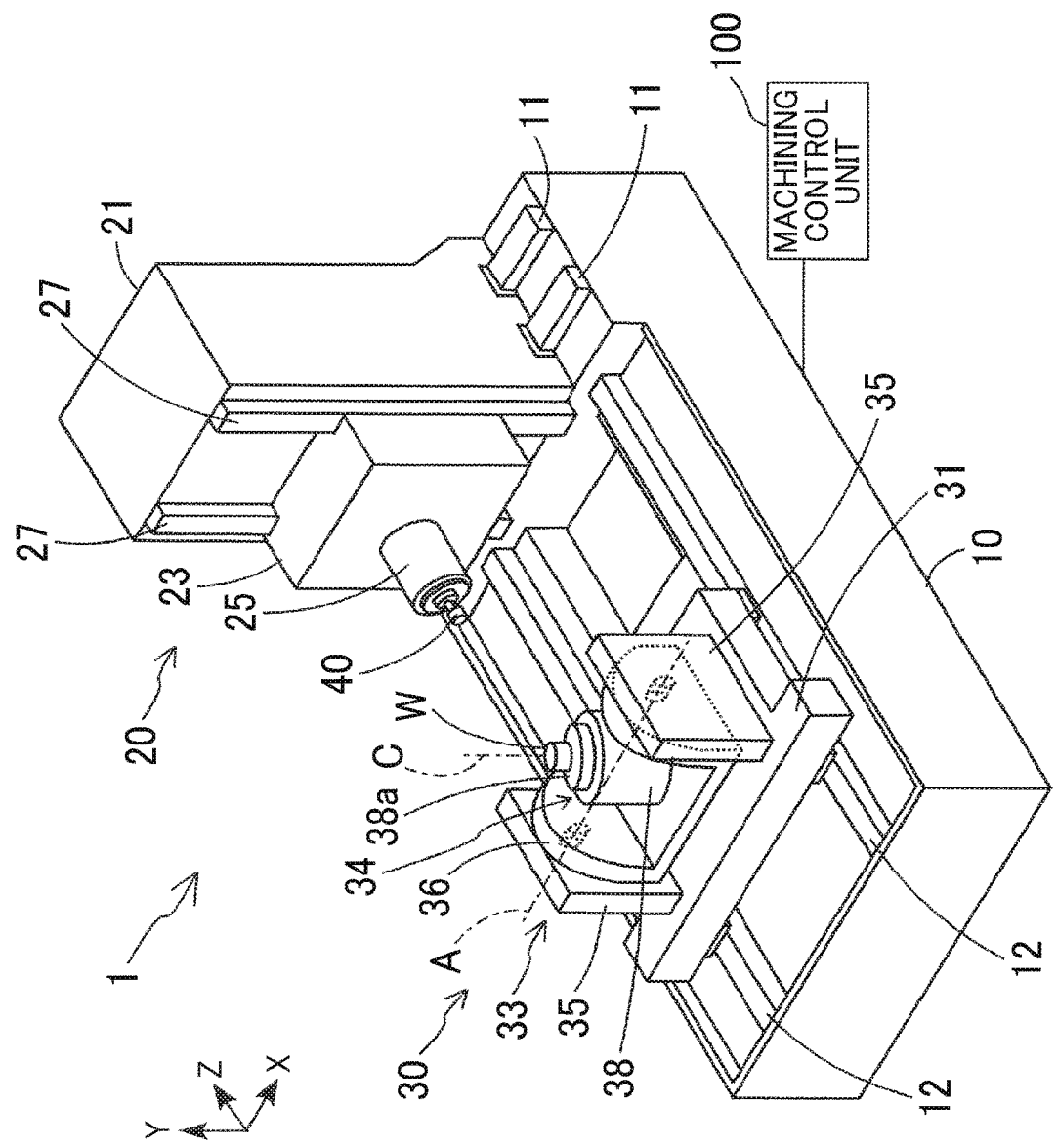
FIG. 1 is a perspective view of a gear machining apparatus according to one embodiment of the present invention.

As illustrated in FIG. 1, the gear machining apparatus 1 is a machining center having three orthogonal linear axes (X-axis, Y-axis, and Z-axis) and two rotation axes (A-axis and C-axis) as driving axes. The gear machining apparatus 1 mainly includes a bed 10, a tool holding device 20, a workpiece holding device 30, and a machining control unit 100.

The bed 10 is arranged on a floor. A pair of X-axis guide rails 11 extending in an X-axis direction and a pair of Z-axis guide rails 12 extending in a Z-axis direction are provided on the upper face of the bed 10. The tool holding device 20 includes a column 21, an X-axis driving device 22 (see FIG. 3), a saddle 23, a Y-axis driving device 24 (see FIG. 3), a tool spindle 25, and a tool spindle motor 26 (see FIG. 3). In FIG. 1, illustrations of the X-axis driving device 22, the Y-axis driving device 24, and the tool spindle motor 26 are omitted.

The column 21 is provided so as to be movable in the X-axis direction while being guided by the X-axis guide rails 11. The X-axis driving device 22 is a screw feed device configured to feed the column 21 in the X-axis direction relative to the bed 10. A pair of Y-axis guide rails 27 extending along a Y-axis direction are provided on the face of the column 21. The saddle 23 is provided so as to be movable in the Y-axis direction relative to the column 21 while being guided by the Y-axis guide rails 27. The Y-axis driving device 24 is a screw feed device configured to feed the saddle 23 in the Y-axis direction.

The tool spindle 25 is supported so as to be rotatable about an axis parallel to the Z-axis direction relative to the saddle 23. A gear cutter 40 is removably attached to the tip of the tool spindle 25, and is used for machining a workpiece W. The gear cutter 40 moves in the X-axis direction along with movement of the column 21, and moves in the Y-axis direction along with movement of the saddle 23. The tool spindle motor 26 applies a driving force for rotating the tool spindle 25, and is housed in the saddle 23.

The workpiece holding device 30 includes a slide 31, a Z-axis driving device 32 (see FIG. 3), a tilting device 33, and a workpiece rotating device 34. In FIG. 1, an illustration of the Z-axis driving device 32 is omitted. The slide 31 is provided so as to be movable in the Z-axis direction relative to the bed 10 while being guided by the Z-axis guide rails 12. The Z-axis driving device 32 is a screw feed device configured to feed the slide 31 in the Z-axis direction.

Figure 3:
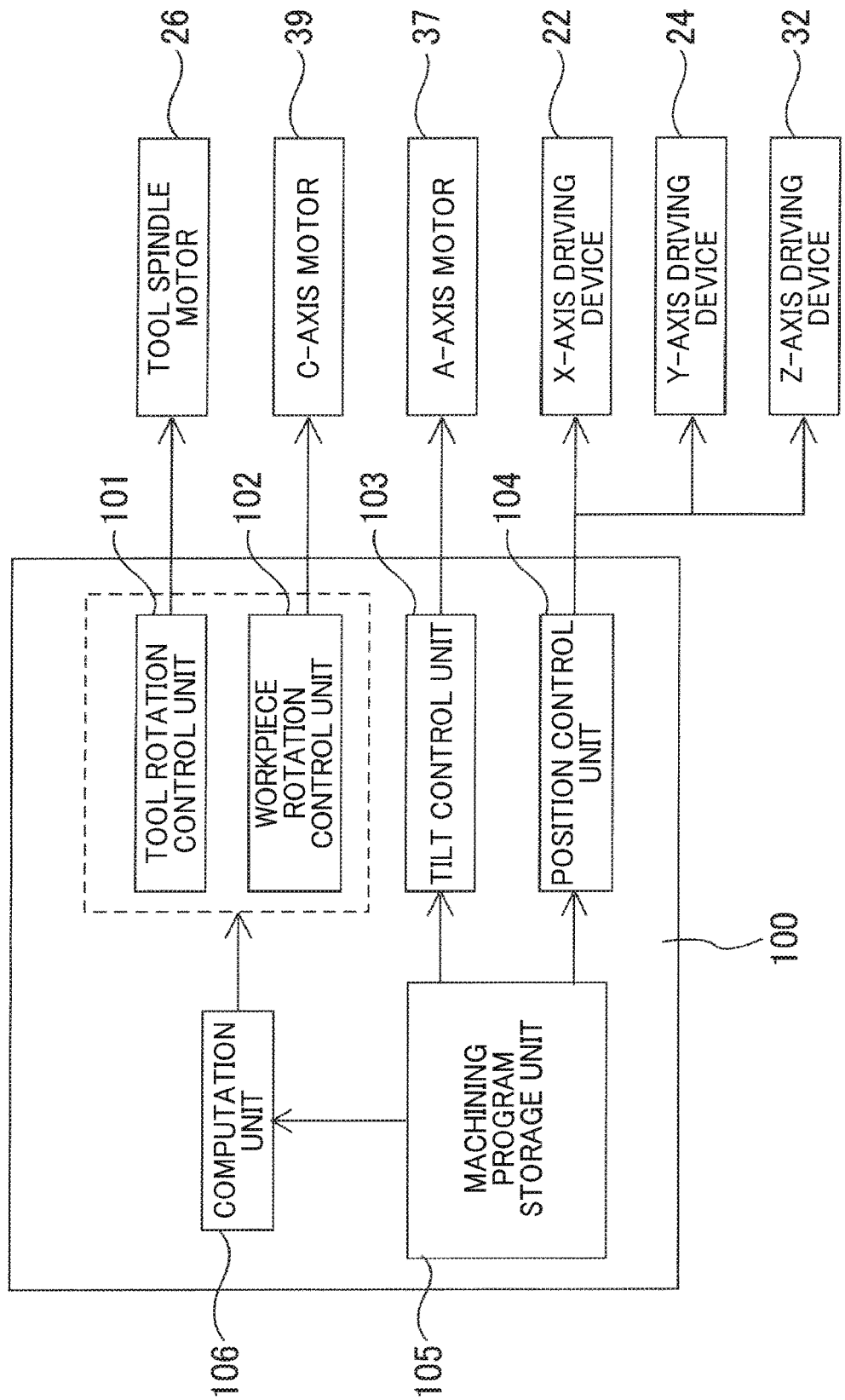
FIG. 3 is a block diagram of a machining control unit.

The tilting device 33 includes a pair of table support portions 35, a tilt table 36, and an A-axis motor 37 (see FIG. 3). The table support portions 35 are arranged on the upper face of the slide 31. The tilt table 36 is supported so as to be pivotable about the A-axis parallel to the X-axis relative to the table support portions 35. The A-axis motor 37 applies a driving force for pivoting the tilt table 36 about the A-axis, and is housed in the table support portion 35.

The workpiece rotating device 34 includes a rotary table 38 and a C-axis motor 39 (see FIG. 3). The rotary table 38 is arranged so as to be rotatable about the C-axis orthogonal to the A-axis relative to the bottom face of the tilt table 36. The rotary table 38 is provided with a holding portion 38a configured to fix the workpiece W. The C-axis motor 39 applies a driving force for rotating the rotary table 38, and is provided on the lower face of the tilt table 36.

When a gear is machined, the gear machining apparatus 1 pivots the tilt table 36 to incline an axis L of the gear cutter 40 with respect to a line parallel to an axis Lw of the workpiece W. In this state, the gear machining apparatus 1 relatively feeds the gear cutter 40 in a direction of the axis Lw of the workpiece W while synchronously rotating the gear cutter 40 and the workpiece W. Thus, the gear machining apparatus 1 generates a gear by cutting work.

Figure 2:
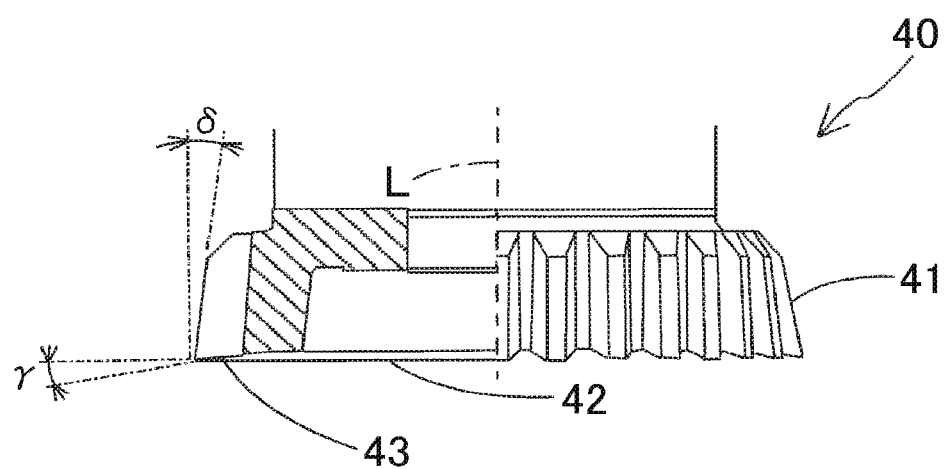
FIG. 2 is a local sectional view of the schematic overall structure of a gear cutter that is viewed in a radial direction.

Next, the gear cutter 40 is described with reference to FIG. 2. As illustrated in FIG. 2, the gear cutter 40 includes a plurality of tool edges 41 having helix angles. Each of the tool edges 41 is formed into a shape of an involute curve when viewed in a direction of the axis L of the gear cutter 40. Each tool edge 41 has a rake face 43 on an end face 42 oriented to the tip of the gear cutter 40 (lower side in FIG. 2). The rake face 43 has a rake angle at which the rake face 43 is inclined by an angle γ with respect to a plane orthogonal to the direction of the axis L of the gear cutter 40. Each tool edge 41 has a front relief angle at which the tool edge 41 is inclined by an angle δ with respect to a straight line parallel to the axis L of the gear cutter 40.

Next, the machining control unit 100 is described with reference to FIG. 3. The machining control unit 100 controls rotation of the workpiece W and rotation of the gear cutter 40, and performs an operation for feeding the gear cutter 40 relative to the workpiece W. As illustrated in FIG. 3, the machining control unit 100 includes a tool rotation control unit 101, a workpiece rotation control unit 102, a tilt control unit 103, a position control unit 104, a machining program storage unit 105, and a computation unit 106.

The tool rotation control unit 101 controls driving of the tool spindle motor 26 to rotate the gear cutter 40 attached to the tool spindle 25. The workpiece rotation control unit 102 controls driving of the C-axis motor 39 to rotate the workpiece W fixed to the rotary table 38 about the axis Lw (about the C-axis). The tilt control unit 103 controls driving of the A-axis motor 37 to pivot the tilt table 36. Thus, the workpiece W fixed to the rotary table 38 pivots about the A-axis, and the axis L of the gear cutter 40 is inclined with respect to the line parallel to the axis Lw of the workpiece W.

The position control unit 104 controls driving of the X-axis driving device 22 to move the column 21 in the X-axis direction, and controls driving of the Y-axis driving device 24 to move the saddle 23 in the Y-axis direction. Thus, the gear cutter 40 held by the tool holding device 20 moves in the X-axis direction and the Y-axis direction relative to the workpiece W held by the workpiece holding device 30. The position control unit 104 controls driving of the Z-axis driving device 32 to move the slide 31 in the Z-axis direction. Thus, the workpiece W held by the workpiece holding device 30 moves in the Z-axis direction relative to the gear cutter 40 held by the tool holding device 20. Accordingly, the gear cutter 40 is fed relative to the workpiece W.

The machining program storage unit 105 stores a machining program to be used for cutting work. The computation unit 106 identifies a machining path along which the gear cutter 40 cuts the workpiece W based on the machining program stored in the machining program storage unit 105. The position control unit 104 controls driving of the X-axis driving device 22, the Y-axis driving device 24, and the Z-axis driving device 32 to move the gear cutter 40 relative to the workpiece W.

Based on the identified machining path, the computation unit 106 derives a crossed axes angle α, a correction angle β, and a feed amount F of the gear cutter 40 relative to the workpiece W. The crossed axes angle α is an inclination angle of the axis L of the gear cutter 40 with respect to the axis Lw of the workpiece W, and is determined based on, for example, the profiles of tooth flanks to be formed on the workpiece W and the helix angle of the tool edge 41. Based on the crossed axes angle α computed by the computation unit 106, the tilt control unit 103 causes the tilt table 36 to pivot so that the inclination angle of the axis L of the gear cutter 40 with respect to the axis Lw of the workpiece W is the crossed axes angle α.

Next, the correction angle β is described. In this embodiment, the correction angle β is defined as follows. That is, assuming that a position where the gear cutter 40 cuts the workpiece W is a "cutting point C", a cutting point C when cutting work is started is defined as a "start point S", and a cutting point C when the gear cutter 40 is fed by the predetermined feed amount F from the start point S is defined as a "movement point M". A cutting point C when the gear cutter 40 is fed by the predetermined feed amount F from the start point S while the workpiece W and the gear cutter 40 rotate in a predetermined reference synchronous rotation state is defined as a "reference movement point MR". A phase shift angle to one side in a circumferential direction of the workpiece W, which is set to shift the phase of the movement point M from that of the reference movement point MR when the gear cutter 40 is fed by the predetermined feed amount F from the start point S, is defined as the "correction angle β".

The "reference synchronous rotation state" is a state in which the workpiece W and the gear cutter 40 rotate synchronously so that the cutting point C that will move along with the feed operation moves along a helix direction of a tooth of a gear to be formed on the workpiece W. If a helical gear is formed on the workpiece W, the reference synchronous rotation state is a state in which the workpiece W and the gear cutter 40 rotate synchronously so that the cutting point C moves along a helix direction of the gear to be formed on the workpiece W. If a spur gear is formed on the workpiece W, the reference synchronous rotation state is a state in which the workpiece W and the gear cutter 40 rotate synchronously so that the cutting point C moves along the direction of the axis Lw of the workpiece W.

That is, when the feed operation is performed in the reference synchronous rotation state, the cutting point C moves along a direction of a tooth trace of a gear to be formed on the workpiece W. The machining control unit 100 can move the cutting point C in a direction different from the direction of the tooth trace by performing the feed operation in a state in which the workpiece W and the gear cutter 40 rotate at a rotation speed ratio different from that in the reference synchronous rotation state.

In this embodiment, the machining control unit 100 changes the rotation speed ratio between the workpiece W and the gear cutter 40 (hereinafter referred to simply as the "rotation speed ratio") by changing the rotation speed of the workpiece W while keeping a constant rotation speed of the gear cutter 40. In this case, the machining control unit 100 can shift the phase of the movement point M from the phase of the reference movement point MR to the one side in the circumferential direction of the workpiece W by increasing the rotation speed of the workpiece W as compared to that in the reference synchronous rotation state. The machining control unit 100 can shift the phase of the movement point M from the phase of the reference movement point MR to the other side in the circumferential direction of the workpiece W by reducing the rotation speed of the workpiece W as compared to that in the reference synchronous rotation state.

Thus, the machining control unit 100 can smoothly change the rotation speed ratio by changing the rotation speed of the workpiece W while keeping the constant rotation speed of the gear cutter 40. In this embodiment, the rotation speed of the workpiece W is changed while keeping the constant rotation speed of the gear cutter 40, but the rotation speed of the gear cutter 40 may be changed while keeping a constant rotation speed of the workpiece W.

In this case, the phase shift angle of the movement point M from the reference movement point MR increases as the feed amount F in the feed operation increases. Therefore, it is necessary to determine the rotation speed ratio based on the correction angle β and the feed amount F. The machining control unit 100 identifies the machining path based on the machining program, derives the correction angle β and the feed amount F based on the machining path, and computes the rotation speed ratio by using the correction angle β and the feed amount F.

Figure 16:
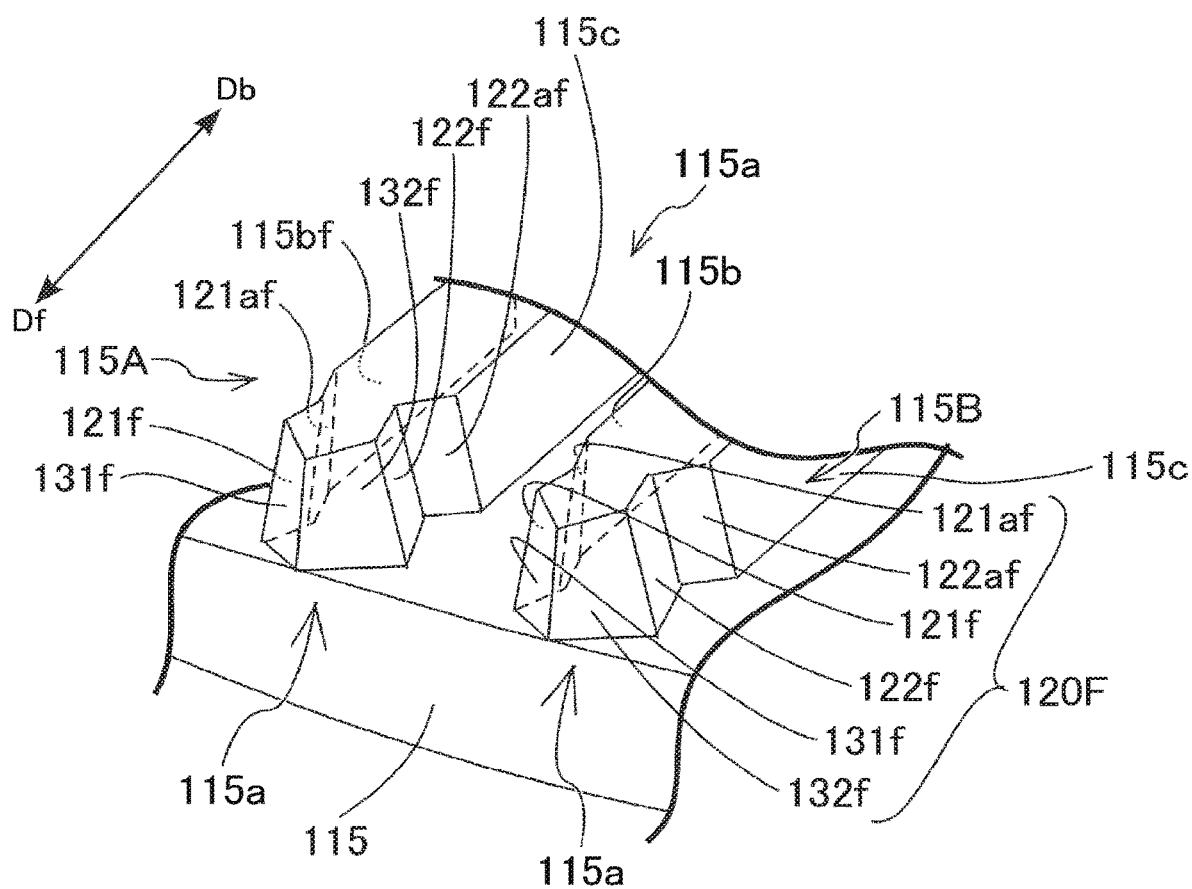
FIG. 16 is a perspective view illustrating gear slip preventing portions having chamfered tooth flanks.
Figure 17:
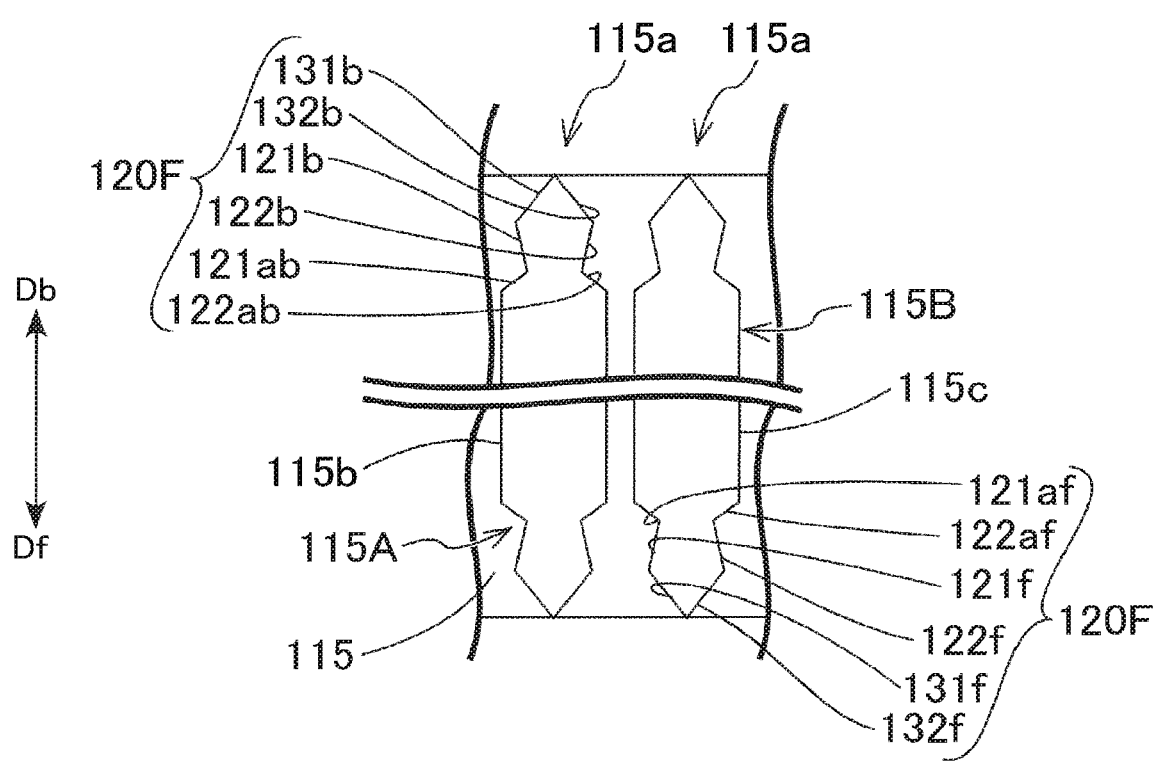
FIG. 17 is a view schematically illustrating a state of the gear slip preventing portions of the sleeve illustrated in FIG. 16 in the radial direction.

Next, a specific example of the correction angle β is described with reference to FIG. 4A to FIG. 5B. Description is given of a case of forming a right front tapered tooth flank 122*f*, a right front subordinate tooth flank 122*af*, and a right front chamfered tooth flank 132*f* of a gear slip preventing portion 120F illustrated in FIG. 16 and FIG. 17. In FIG. 4A to FIG. 5B, the end face of the workpiece W is hatched for clear illustration.

Figure 4A:
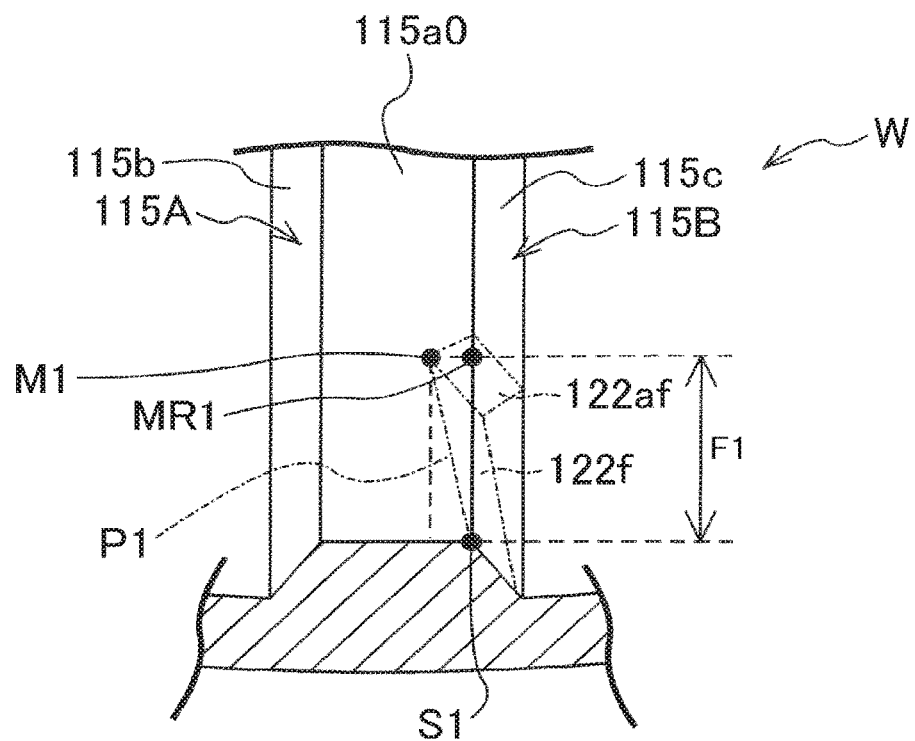
FIG. 4A is a view partially illustrating a spline tooth that is viewed obliquely from the top.
Figure 4B:
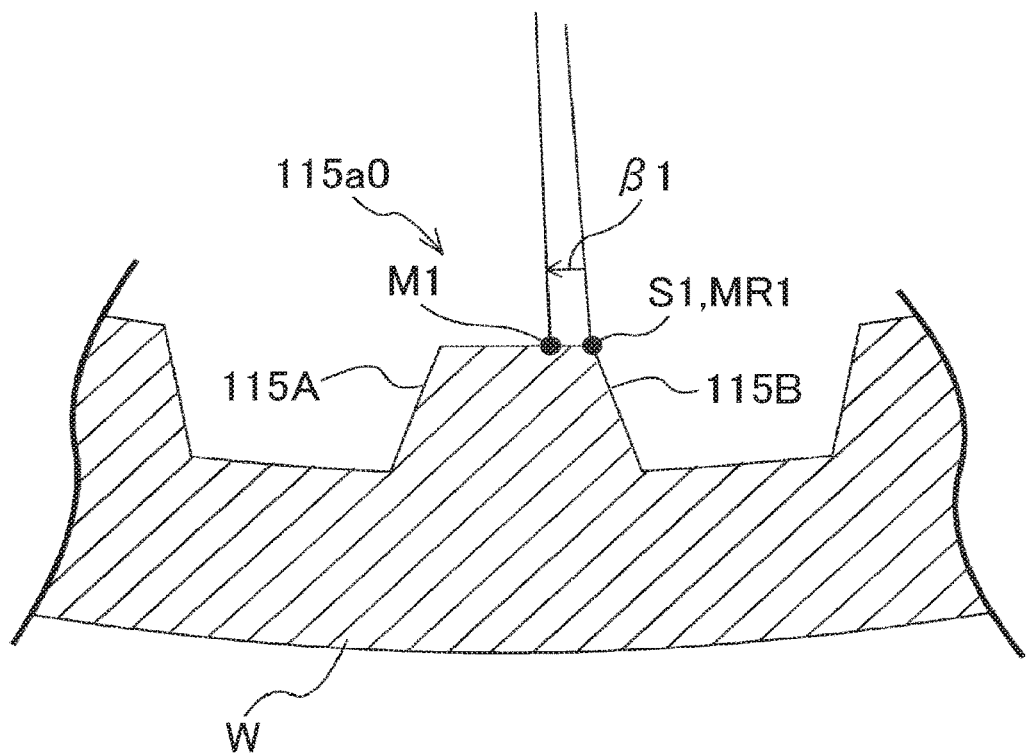
FIG. 4B is a view partially illustrating a workpiece in an axial direction.

FIG. 4A and FIG. 4B illustrate a state after a spline tooth 115*a*0 is formed on the inner peripheral surface of the workpiece W. The spline tooth 115*a*0 has a right tooth flank 115*c* and a left tooth flank 115*b* formed over the entire areas of a right face 115B and a left face 115A, respectively. In FIG. 4A, a first path P1 is indicated by a long dashed short dashed line. The first path P1 is a machining path along which the cutting point C moves when the right front tapered tooth flank 122*f* is formed. The gear machining apparatus 1 forms the right front tapered tooth flank 122*f* on the right tooth flank 115*c* of the spline tooth 115*a*0 by moving the cutting point C along the first path P1. The right front subordinate tooth flank 122*af* is naturally formed when the cutting point C is moved to the movement point M.

As illustrated in FIG. 4A and FIG. 4B, the direction of the tooth trace of the spline tooth 115*a*0 is parallel to the axis Lw of the workpiece W. The first path P1 is inclined with respect to the axis Lw of the workpiece W.

After the first path P1 is identified, the computation unit 106 derives a start point S1 and a movement point M1 based on the first path P1. The computation unit 106 derives a feed amount F1 for moving the cutting point C along the first path P1 based on the start point S1 and the movement point M1, and derives a reference movement point MR1 based on the start point S1 and the feed amount F1. Then, the computation unit 106 derives a correction angle $\beta 1$ based on the reference movement point MR1 and the movement point M1. The movement point M1 is located on the one side in the circumferential direction of the workpiece W (left side in FIG. 4A) with respect to the reference movement point MR1, and therefore the correction angle $\beta 1$ is a positive value. Then, the computation unit 106 computes a rotation speed ratio by using the correction angle $\beta 1$ and the feed amount F1. Since the correction angle $\beta 1$ is the positive value, the workpiece rotation control unit 102 increases the rotation speed of the workpiece W as compared to that in the reference synchronous rotation state.

Figure 5A:
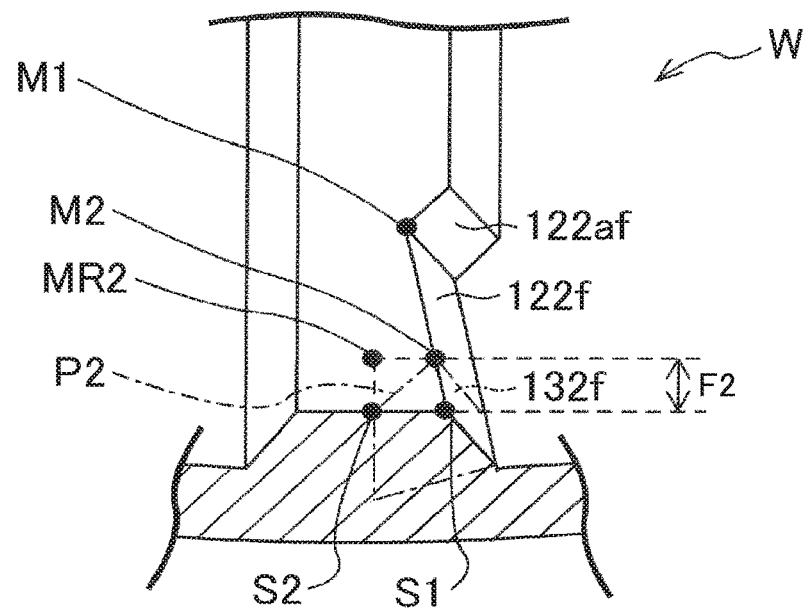
FIG. 5A is a view partially illustrating the spline tooth that is viewed obliquely from the top, and also illustrating a state after a right front tapered tooth flank and a right front subordinate tooth flank are formed.
Figure 5B:
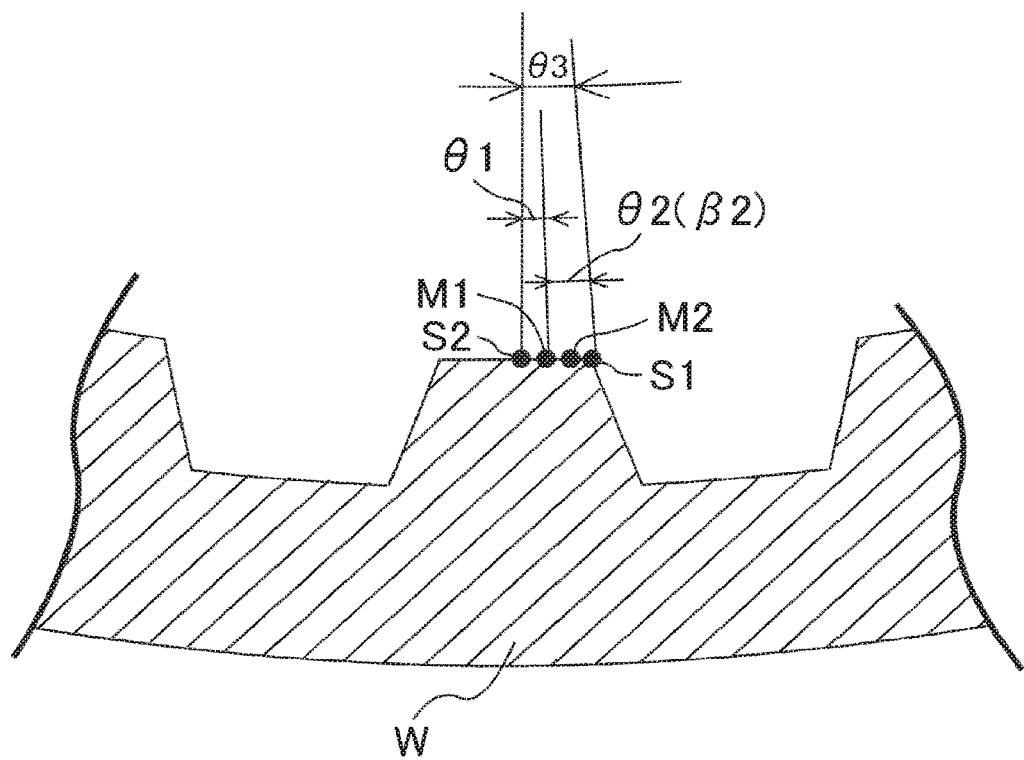
FIG. 5B is a view partially illustrating the workpiece in the axial direction, and also illustrating the state after the right front tapered tooth flank and the right front subordinate tooth flank are formed.

FIG. 5A and FIG. 5B illustrate the spline tooth 115*a*0 on which the right front tapered tooth flank 122*f* and the right front subordinate tooth flank 122*af* are formed. A second path P2 is indicated by a long dashed short dashed line. The second path P2 is a machining path when the right front chamfered tooth flank 132*f* is formed. The gear machining apparatus 1 forms the right front chamfered tooth flank 132*f* on the right front tapered tooth flank 122*f* by moving the cutting point C along the second path P2.

As illustrated in FIG. 5A and FIG. 5B, after the second path P2 is identified, the computation unit 106 derives a start point S2 and a movement point M2 based on the second path P2. Next, the computation unit 106 derives a feed amount F2 for moving the cutting point C along the second path P2 based on the start point S2 and the movement point M2, and derives a reference movement point MR2 based on the start point S2 and the feed amount F2. Then, the computation unit 106 derives a correction angle $\beta 2$ based on the reference movement point MR2 and the movement point M2. The movement point M2 is located on the other side in the circumferential direction of the workpiece W (right side in FIG. 5A) with respect to the reference movement point MR2, and therefore the correction angle $\beta 2$ is a negative value. Then, the computation unit 106 computes a rotation speed ratio by using the correction angle $\beta 2$ and the feed amount F2. Since the correction angle $\beta 2$ is the negative value, the workpiece rotation control unit 102 reduces the rotation speed of the workpiece W as compared to that in the reference synchronous rotation state.

The phase of the start point S2 of the second path P2 is shifted from the phase of the movement point M1 of the first path P1 to the one side in the circumferential direction by a first angle $\theta 1$. In this case, the machining control unit 100 needs to set the phase of the gear cutter 40 with respect to that of the workpiece W again so that the cutting point C is located at the start point S2 of the second path P2 when cutting work for the right front chamfered tooth flank 132*f* is started after cutting work for the right front tapered tooth flank 122*f* is finished.

The gear machining apparatus 1 adjusts the phases of the workpiece W and the gear cutter 40 by adjusting the rotation speed ratio between the workpiece W and the gear cutter 40. That is, the machining control unit 100 computes the rotation speed ratio between the workpiece W and the gear cutter 40 based on the movement point M1 of the first path P1 and the start point S2 of the second path P2, and performs a returning operation while rotating the workpiece W and the gear cutter 40 at the computed rotation speed ratio.

Specifically, the machining control unit 100 assumes the movement point M1 as the start point S of the returning operation, and assumes the start point S2 as the movement point M of the returning operation. The machining control unit 100 assumes a distance from a first finish position to a second start position in the direction of the axis Lw of the workpiece W as the feed amount F, and assumes the first angle $\theta 1$ as the correction angle $\beta$. Based on the distance from the first finish position to the second start position and the first angle $\theta 1$, the machining control unit 100 computes the rotation speed ratio between the workpiece W and the gear cutter 40 during the returning operation.

Thus, the gear machining apparatus 1 can determine the rotation speed ratio during the returning operation from the first finish position to the second start position based on the distance from the first finish position to the second start position in the direction of the axis Lw of the workpiece W and based on the first angle $\theta 1$. That is, the gear machining apparatus 1 can compute the rotation speed ratio during the returning operation by deriving the first angle $\theta 1$ through procedures similar to the procedures for computing the rotation speed ratio by deriving the correction angle $\beta$ and the feed amount F during the cutting work. Accordingly, the machining control unit 100 can easily compute the rotation speed ratio during the returning operation.

The gear machining apparatus 1 can adjust the phase of the gear cutter 40 to that of the workpiece W while keeping the state in which the workpiece W and the gear cutter 40 rotate synchronously. In this case, the gear machining apparatus 1 can reduce a time required from the finish of the cutting work for the right front tapered tooth flank 122*f* to the start of the cutting work for the right front chamfered tooth flank 132*f* as compared to a case where the rotation of the workpiece W and the rotation of the gear cutter 40 are temporarily stopped and the workpiece W and the gear cutter 40 are rotated again after the phase adjustment. Thus, the gear machining apparatus 1 can reduce a cycle time.

The first angle $\theta 1$ can be computed based on a phase shift angle between the start point S1 and the movement point M1 of the first path P1 (that is, the correction angle $\beta 1$) and a phase shift angle between the start point S1 of the first path P1 and the start point S2 of the second path P2. That is, assuming that a phase shift angle of the movement point M1 from the start point S1 to the one side in the circumferential direction is a second angle $\theta 2$ and a phase shift angle of the start point S2 from the start point S1 to the one side in the circumferential direction is a third angle $\theta 3$, the first angle $\theta 1$ is a difference obtained by subtracting the second angle $\theta 2$ from the third angle $\theta 3$.

Thus, the computation unit 106 can easily determine the first angle $\theta 1$.

The computation unit 106 can also determine the third angle $\theta 3$ by deriving the first angle $\theta 1$ and the second angle $\theta 2$ and computing the sum of the first angle $\theta 1$ and the second angle $\theta 2$. Thus, the computation unit 106 can compute one of the first angle $\theta 1$ and the third angle $\theta 3$ by deriving the second angle $\theta 2$ serving as the correction angle $\beta$ and the other one of the first angle $\theta 1$ and the third angle $\theta 3$.

Next, an operation of the gear machining apparatus 1 when the right front tapered tooth flank 122$f$, the right front subordinate tooth flank 122$af$, and the right front chamfered tooth flank 132$f$ are formed on the right tooth flank 115$c$ is described with reference to FIG. 6 to FIG. 7E.

Figure 6:
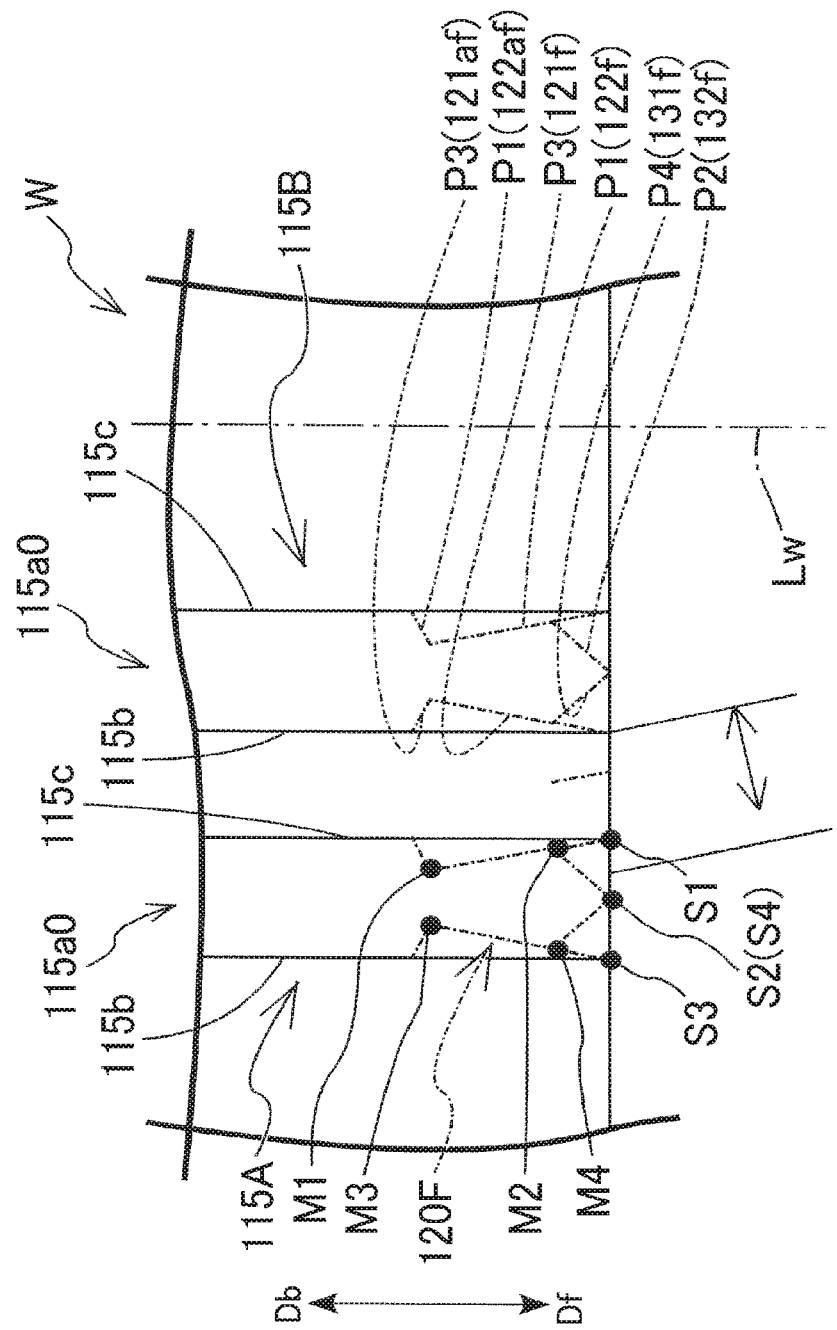
FIG. 6 is a view schematically illustrating a state of the spline teeth that are viewed in the radial direction.

FIG. 6 illustrates the workpiece W after the spline teeth 115$a$0 are formed. FIG. 6 illustrates only a subset of the spline teeth 115$a$0. The first path P1, the second path P2, a third path P3, and a fourth path P4 are indicated by long dashed short dashed lines. The third path P3 is a machining path when a left front tapered tooth flank 121$f$ and a left front subordinate tooth flank 121$af$ are formed. The fourth path P4 is a machining path when a left front chamfered tooth flank 131$f$ is formed.

Figure 7A:
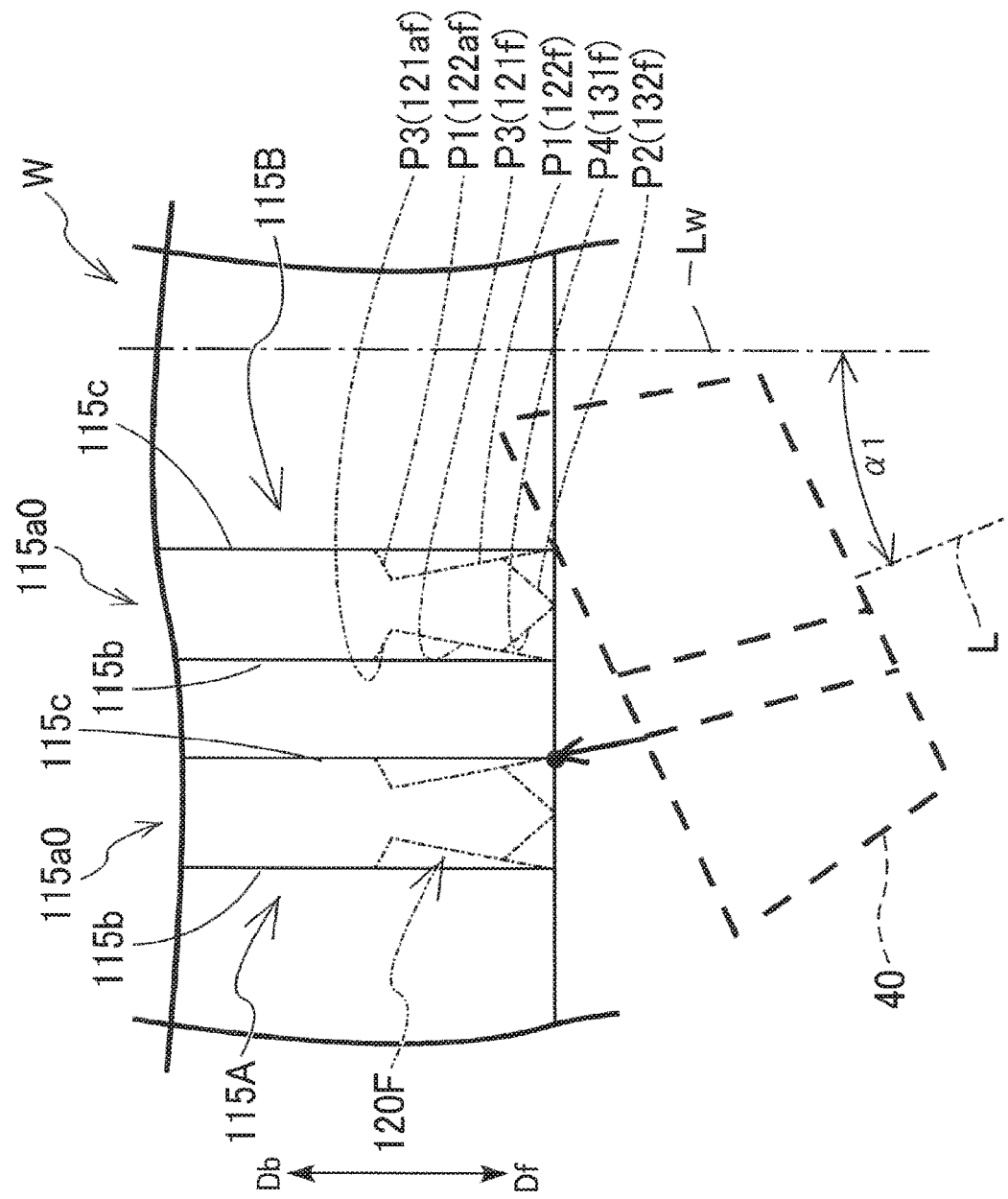
FIG. 7A is a view schematically illustrating a relative position of the gear cutter to the workpiece, and also illustrating a state before cutting work for the right front tapered tooth flank is started.
Figure 7B:
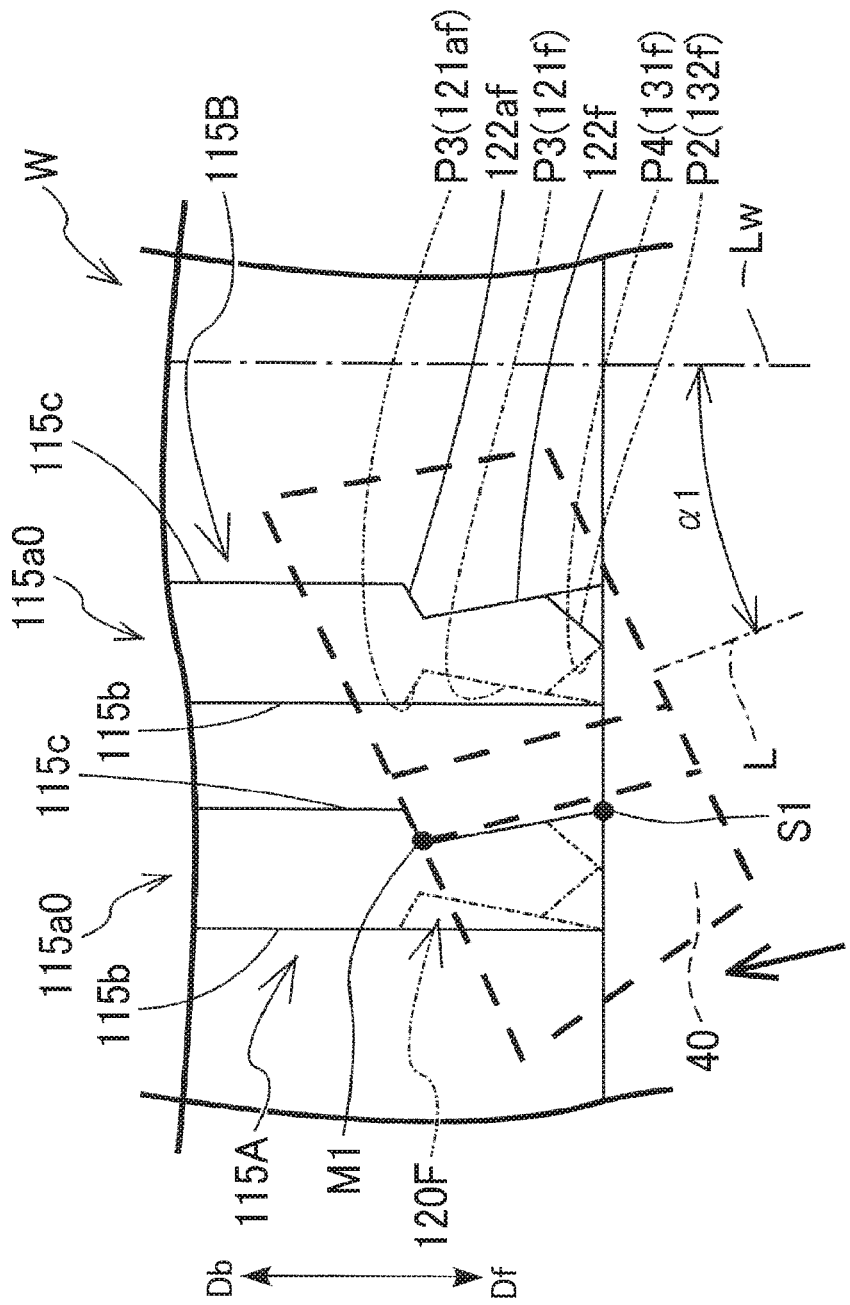
FIG. 7B is a view schematically illustrating a relative position of the gear cutter to the workpiece, and also illustrating a state in which the cutting work for the right front tapered tooth flank is finished.

As illustrated in FIG. 7A and FIG. 7B, when the right front tapered tooth flank 122$f$ is formed, the machining control unit 100 sets the inclination angle of the axis L of the gear cutter 40 with respect to the axis Lw of the workpiece W to a crossed axes angle $\alpha 1$. Then, the machining control unit 100 moves the cutting point C from the start point S1 to the movement point M1 by performing a feed operation from the one rotation axis side Df to the other rotation axis side Db while rotating the workpiece W and the gear cutter 40 at a rotation speed ratio computed in advance by the computation unit 106. Thus, the right front tapered tooth flank 122$f$ is formed. At this time, the machining control unit 100 sets the rotation speed of the workpiece W to be higher than the rotation speed in the reference synchronous rotation state. At this time, the machining control unit 100 keeps a constant feed speed.

Figure 7C:
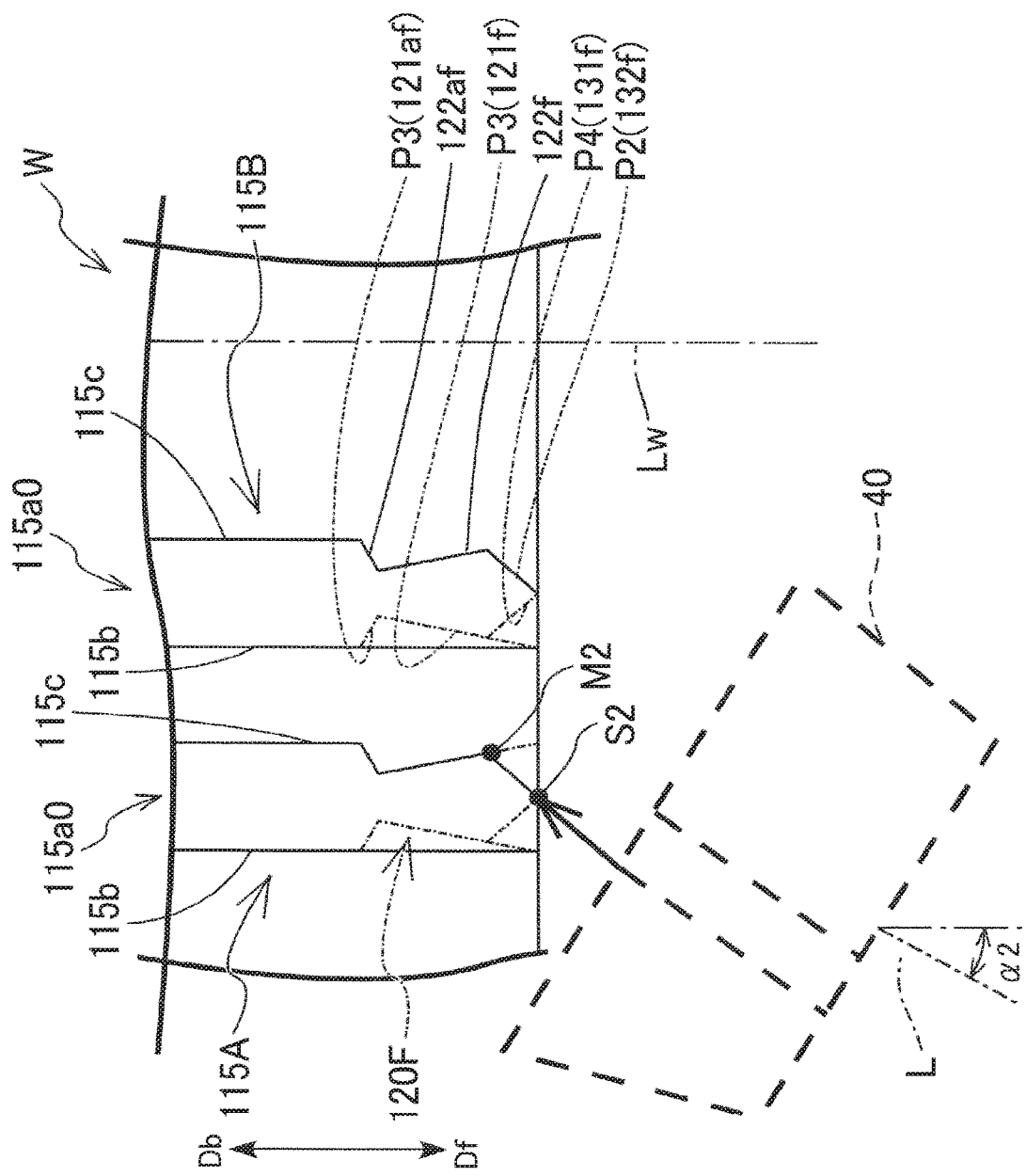
FIG. 7C is a view schematically illustrating a relative position of the gear cutter to the workpiece, and also illustrating a state before cutting work for a right front chamfered tooth flank is started.

As illustrated in FIG. 7B and FIG. 7C, the machining control unit 100 performs a returning operation for the gear cutter 40 when the cutting work for the right front tapered tooth flank 122$f$ is finished. At this time, the workpiece rotation control unit 102 changes the rotation speed of the workpiece W, and relatively feeds the gear cutter 40 from the other rotation axis side Db to the one rotation axis side Df while rotating the workpiece W and the gear cutter 40 at a computed rotation speed ratio in the returning operation. Thus, the gear machining apparatus 1 can perform the returning operation in parallel to the adjustment of the phase of the gear cutter 40 to that of the workpiece W. Next, the tilt control unit 103 pivots the tilt table 36 (see FIG. 1) so that the inclination angle of the axis L of the gear cutter 40 with respect to the axis Lw of the workpiece W is a crossed axes angle $\alpha 2$.

Figure 7D:
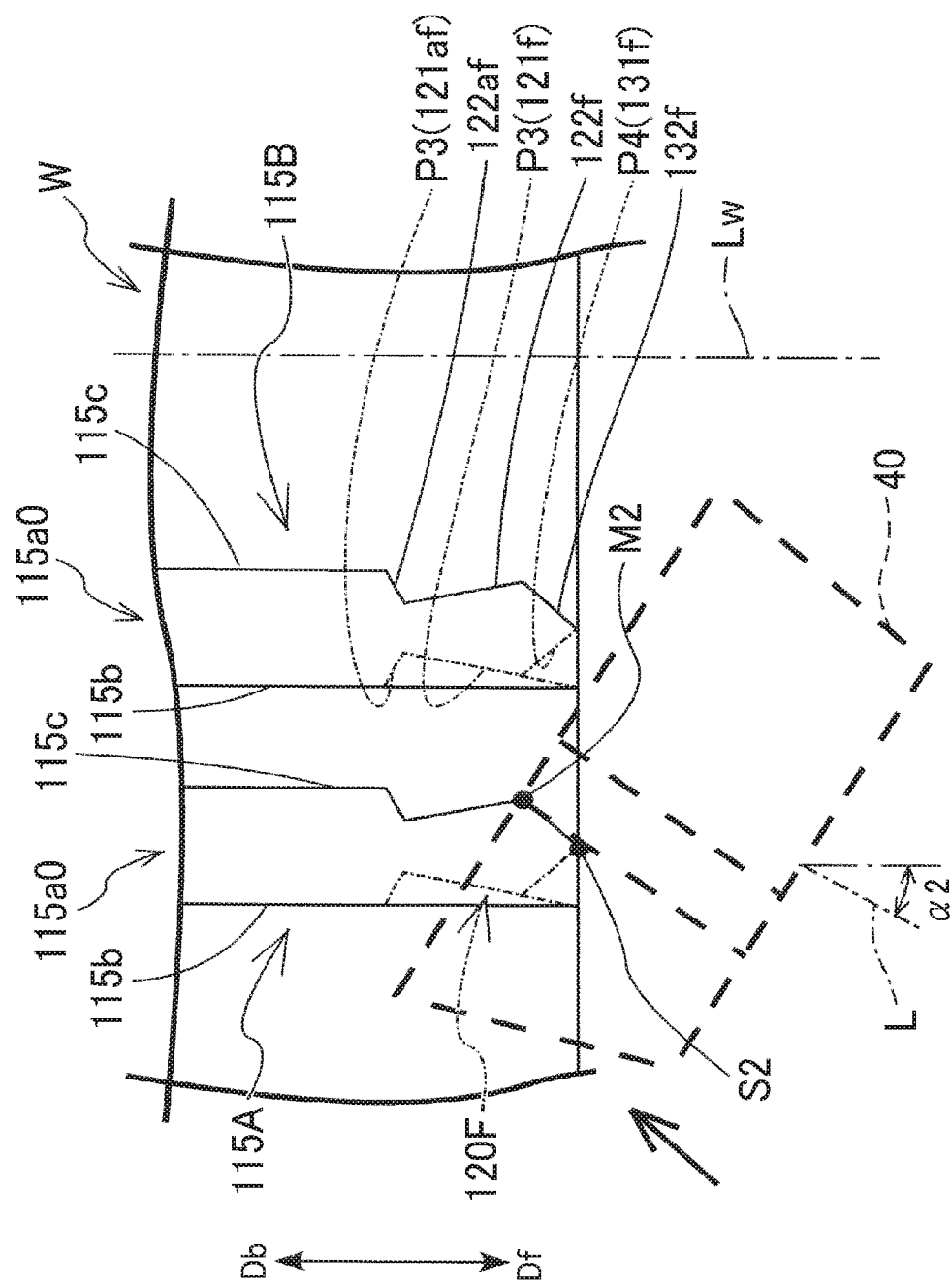
FIG. 7D is a view schematically illustrating a relative position of the gear cutter to the workpiece, and also illustrating a state in which the cutting work for the right front chamfered tooth flank is finished.

As illustrated in FIG. 7C and FIG. 7D, the machining control unit 100 moves the cutting point C from the start point S2 to the movement point M2 by performing a feed operation from the one rotation axis side Df to the other rotation axis side Db while rotating the workpiece W and the gear cutter 40 at a rotation speed ratio computed in advance by the computation unit 106. Thus, the right front chamfered tooth flank 132$f$ is formed. At this time, the machining control unit 100 sets the rotation speed of the workpiece W to be lower than the rotation speed in the reference synchronous rotation state.

Figure 7E:
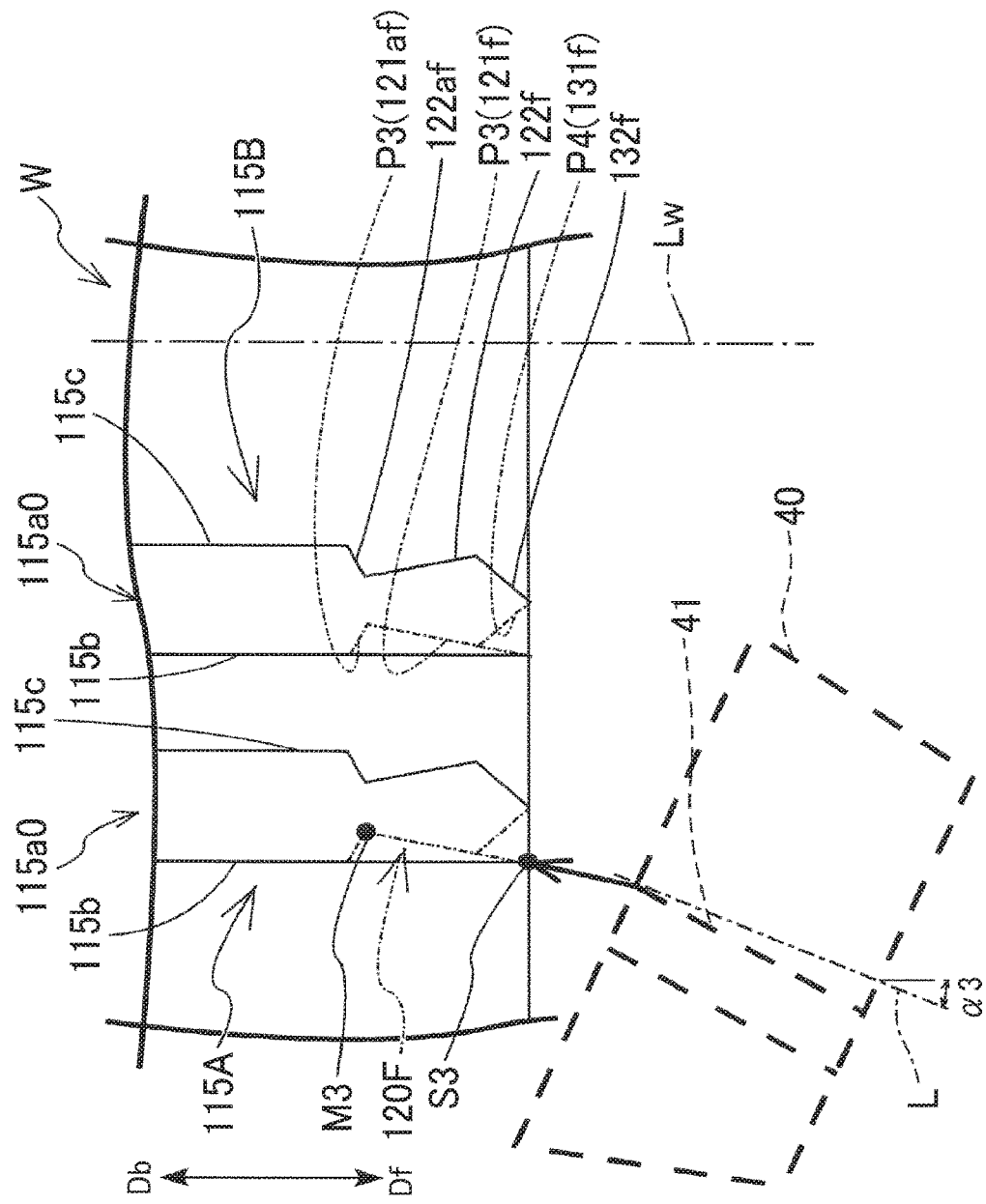
FIG. 7E is a view schematically illustrating a relative position of the gear cutter to the workpiece, and also illustrating a state before cutting work for a left front tapered tooth flank is started.

As illustrated in FIG. 7D and FIG. 7E, the machining control unit 100 performs a returning operation for the gear cutter 40 when the cutting work for the right front chamfered tooth flank 132$f$ is finished. At this time, the machining control unit 100 relatively feeds the gear cutter 40 from the other rotation axis side Db to the one rotation axis side Df in a state in which the rotation of the workpiece W and the rotation of the gear cutter 40 are stopped. Then, the tilt control unit 103 pivots the tilt table 36 so that the inclination angle of the axis L of the gear cutter 40 with respect to the axis Lw of the workpiece W is a crossed axes angle $\alpha 3$. Next, the machining control unit 100 adjusts the phases of the spline teeth 115$a$0 formed on the workpiece W and the tool edges 41 of the gear cutter 40.

Then, the machining control unit 100 performs cutting work for the left front tapered tooth flank 121$f$ by performing a feed operation from the one rotation axis side Df to the other rotation axis side Db while rotating the workpiece W and the gear cutter 40 in directions opposite to those in the cutting work for the right front tapered tooth flank 122$f$ and the right front chamfered tooth flank 132$f$. Then, the machining control unit 100 performs cutting work for the left front tapered tooth flank 121$f$ and the left front chamfered tooth flank 131$f$ through procedures similar to those when the right front tapered tooth flank 122$f$ and the right front chamfered tooth flank 132$f$ are formed.

Next, gear machining processing to be executed by the machining control unit 100 is described with reference to a flowchart illustrated in FIG. 8. The gear machining processing is executed when the spline teeth 115$a$0 are formed on the inner peripheral surface of the workpiece W formed into a cylindrical shape and then the gear slip preventing portions 120F are formed.

Figure 8:
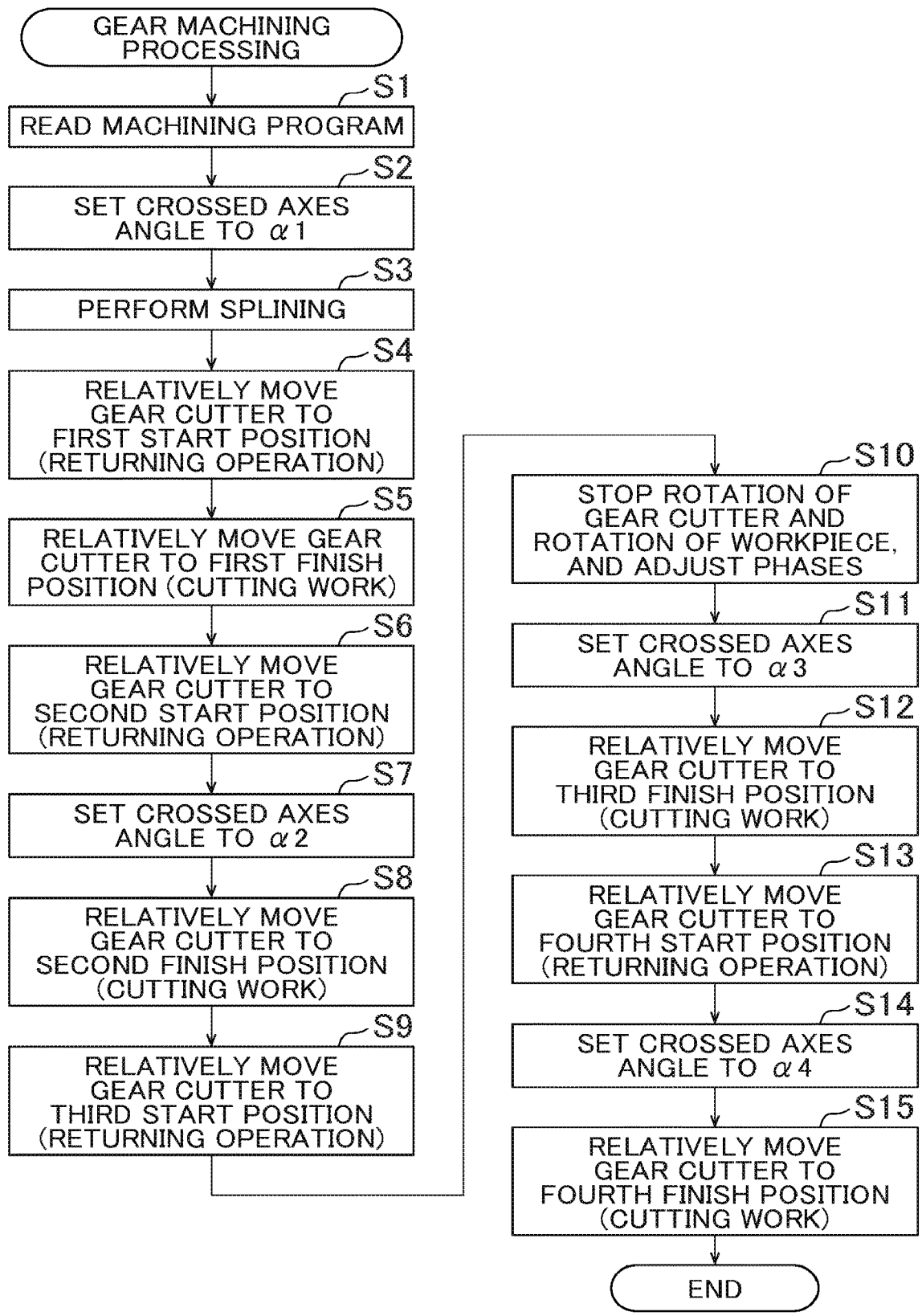
FIG. 8 is a flowchart illustrating gear machining processing to be executed by the machining control unit.

As illustrated in FIG. 8, the machining control unit 100 reads the machining program stored in the machining program storage unit 105 in the gear machining processing (S1). The machining control unit 100 identifies a machining path based on the machining program. Then, the machining control unit 100 sets the inclination angle of the gear cutter 40 with respect to the axis Lw of the workpiece W to the crossed axes angle $\alpha$ (S2), and performs splining (S3). At this time, the machining control unit 100 performs a feed operation from the one rotation axis side Df to the other rotation axis side Db in a state in which the correction angle is set to 0°. Thus, the spline teeth 115$a$0 having tooth traces parallel to the axis Lw of the workpiece W are formed on the inner peripheral surface of the workpiece W by cutting work.

After the processing of S3, the machining control unit 100 relatively moves the gear cutter 40 to a first start position by performing a returning operation from the other rotation axis side Db to the one rotation axis side Df (S4). The first start position is a start position of a feed operation when the right front tapered tooth flank 122$f$ is formed. After the processing of S4, the machining control unit 100 relatively moves the cutting point C along the first path P1 by performing a feed operation from the one rotation axis side Df to the other rotation axis side Db. Thus, the right front tapered tooth flank 122$f$ and the right front subordinate tooth flank 122$af$ are formed by cutting work (S5).

During the splining in the processing of S3, the gear machining apparatus 1 sets the inclination angle of the axis L of the gear cutter 40 with respect to the axis Lw of the workpiece W to be equal to the crossed axes angle $\alpha 1$ that is set in the cutting work for the right front tapered tooth flank 122$f$. Thus, the machining control unit 100 can eliminate a need to change the inclination angle of the axis L of the gear cutter 40 with respect to the axis Lw of the workpiece W when the processing of S4 is started.

The gear machining apparatus 1 can also eliminate a need to move the workpiece W because both the cutting work for the spline teeth 115$a$0 and the cutting work for the gear slip preventing portions 120F are performed by using the gear cutter 40 to be used in the cutting work for the gear slip preventing portions 120F. After the splining is finished, the gear machining apparatus 1 can directly proceed to the cutting work for the gear slip preventing portions 120F without releasing the workpiece W from the workpiece holding device 30. Thus, the gear machining apparatus 1 can eliminate a need for centering before the cutting work for the gear slip preventing portions 120F is started. As a result, the gear machining apparatus 1 can reduce the cycle time and improve the machining accuracy.

When the processing of S5 is finished, the machining control unit 100 performs a returning operation from the other rotation axis side Db to the one rotation axis side Df (S6). In the processing of S6, the machining control unit 100 relatively moves the gear cutter 40 from the first finish position to the second start position. The first finish position is a finish position of the feed operation when the right front tapered tooth flank 122$f$ is formed. The second start position is a start position of a feed operation when the right front chamfered tooth flank 132$f$ is formed. After the processing of S6, the machining control unit 100 sets the crossed axes angle to α2 at the second start position (S7). After the processing of S7, the machining control unit 100 relatively moves the cutting point C along the second path P2 by performing a feed operation from the one rotation axis side Df to the other rotation axis side Db. Thus, the right front chamfered tooth flank 132$f$ is formed by cutting work (S8).

After the processing of S8, the machining control unit 100 performs a returning operation from the other rotation axis side Db to the one rotation axis side Df (S9). In the processing of S9, the machining control unit 100 relatively moves the gear cutter 40 from a second finish position to a third start position. The second finish position is a finish position of the feed operation when the right front chamfered tooth flank 132$f$ is formed. The third start position is a start position of a feed operation when the left front tapered tooth flank 121$f$ is formed. After the processing of S9, the machining control unit 100 temporarily stops the rotation of the workpiece W and the rotation of the gear cutter 40, and adjusts the phases of the spline teeth 115$a$0 formed on the workpiece W and the tool edges 41 of the gear cutter 40 (S10). Then, the machining control unit 100 changes the crossed axes angle to α3 (S11).

Next, the machining control unit 100 relatively moves the cutting point C along the third path P3 by performing a feed operation from the one rotation axis side Df to the other rotation axis side Db while rotating the workpiece W and the gear cutter 40 in directions opposite to those in the cutting work for the right front tapered tooth flank 122$f$ and the right front chamfered tooth flank 132$f$. Thus, the left front tapered tooth flank 121$f$ and the left front subordinate tooth flank 121$af$ are formed by cutting work (S12).

After the processing of S12, the machining control unit 100 performs a returning operation from the other rotation axis side Db to the one rotation axis side Df (S13). In the processing of S13, the machining control unit 100 relatively moves the gear cutter 40 from a third finish position to a fourth start position. The third finish position is a finish position of the feed operation when the left front tapered tooth flank 121$f$ is formed. The fourth start position is a start position of a feed operation when the left front chamfered tooth flank 131$f$ is formed.

Assuming that a phase shift angle of the fourth start position from the third finish position to the other side in the circumferential direction of the workpiece W is a fourth angle θ4, the machining control unit 100 can derive the fourth angle θ4 through procedures similar to those for the first angle θ1. That is, the machining control unit 100 assumes the fourth angle θ4 as a correction angle, and assumes a distance from the third finish position to the fourth start position in the direction of the axis Lw of the workpiece W as a feed amount. Based on the distance from the third finish position to the fourth start position in the direction of the axis Lw of the workpiece W and based on the fourth angle θ4, the machining control unit 100 can determine a rotation speed ratio during the returning operation from the third finish position to the fourth start position. Thus, the machining control unit 100 can adjust the phase of the gear cutter 40 to that of the workpiece W while keeping the state in which the workpiece W and the gear cutter 40 rotate synchronously.

After the processing of S13, the machining control unit 100 sets the crossed axes angle to α4 at the fourth start position (S14). After the processing of S14, the machining control unit 100 moves the cutting point C along the fourth path P4 by performing a feed operation from the one rotation axis side Df to the other rotation axis side Db. Thus, the left front chamfered tooth flank 131$f$ is formed (S15). Then, this processing is finished.

When the gear machining processing described above is finished, the gear machining apparatus 1 forms gear slip preventing portions 120B on the other rotation axis side Db of the spline teeth 115$a$0 through procedures similar to those in the gear machining processing described above.

In the gear machining processing described above, description is given taking the exemplary case where each of the right front tapered tooth flank 122$f$, the right front chamfered tooth flank 132$f$, the left front tapered tooth flank 121$f$, and the left front chamfered tooth flank 131$f$ is formed by cutting work through a single feed operation. Each of the right front tapered tooth flank 122$f$, the right front chamfered tooth flank 132$f$, the left front tapered tooth flank 121$f$, and the left front chamfered tooth flank 131$f$ may be formed by cutting work through a plurality of feed operations. In the example described above, description is given of the case where the left front tapered tooth flank 121$f$ and the left front chamfered tooth flank 131$f$ are formed after the right front tapered tooth flank 122$f$ and the right front chamfered tooth flank 132$f$ are formed. The right front tapered tooth flank 122$f$ and the right front chamfered tooth flank 132$f$ may be formed after the left front tapered tooth flank 121$f$ and the left front chamfered tooth flank 131$f$ are formed.

As described above, the machining control unit 100 sets the correction angle to the first angle θ1 when the cutting work for the right front chamfered tooth flank 132$f$ is started after the cutting work for the right front tapered tooth flank 122$f$ is finished. Then, the machining control unit 100 moves the gear cutter 40 from the first finish position to the second start position while rotating the workpiece W and the gear cutter 40. That is, the gear machining apparatus 1 assumes the first angle θ1 as the correction angle, and can adjust the phase shift of the second start position from the first finish position while keeping the state in which the workpiece W and the gear cutter 40 rotate when the gear cutter 40 is fed from the first finish position to the second start position. Thus, the gear machining apparatus 1 can reduce the time required from the finish of the cutting work for the right front tapered tooth flank 122$f$ to the start of the cutting work for the right front chamfered tooth flank 132$f$. Accordingly, the cycle time can be reduced.

Next, a second embodiment is described. In the second embodiment, description is given of a case where the gear slip preventing portions 120F and 120B are formed by using a gear cutter 240 including two tools. The same components as those of the first embodiment described above are represented by the same reference symbols to omit their description.

Figure 9:
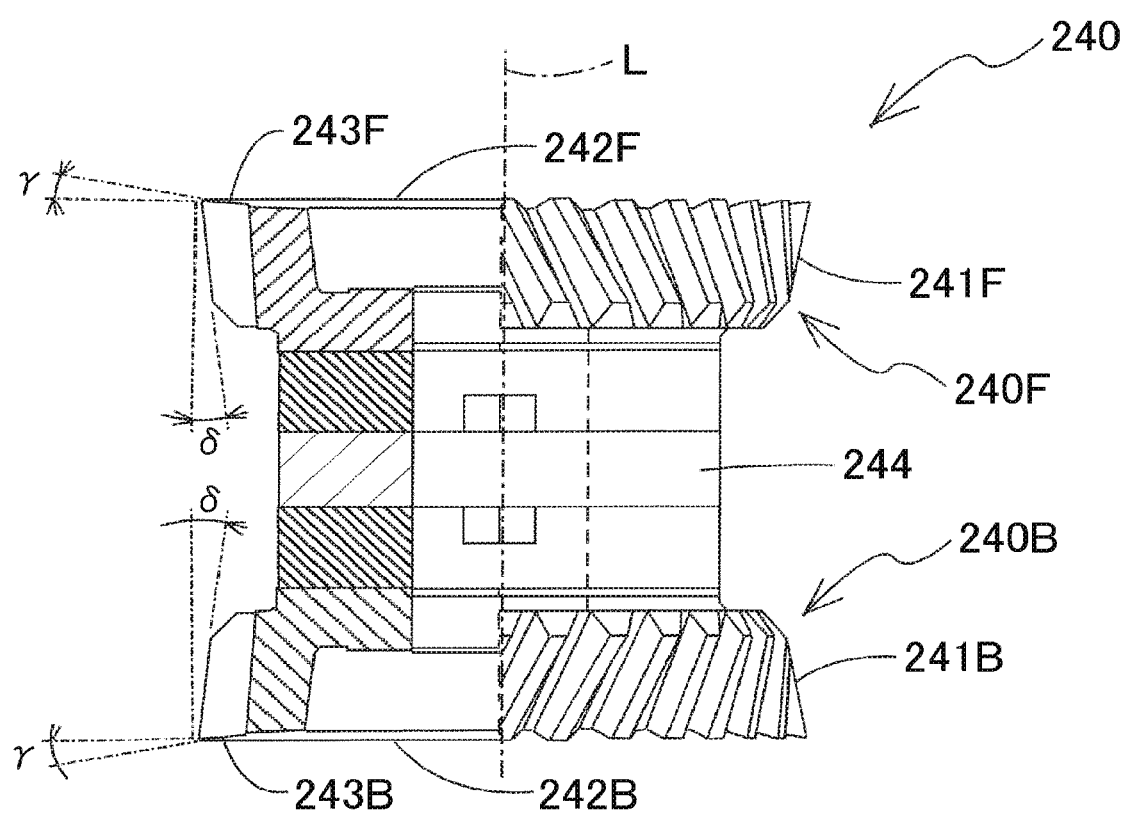
FIG. 9 is a local sectional view of the schematic overall structure of a gear cutter according to a second embodiment that is viewed in the radial direction.

As illustrated in FIG. 9, the gear cutter 240 includes a first tool 240F, a second tool 240B, and a collar 244. The first tool 240F has a plurality of first tool edges 241F. The second tool 240B has a plurality of second tool edges 241B. The collar 244 is arranged between the first tool 240F and the second tool 240B. The gear cutter 240 is a tool having a structure equivalent to that of a machining tool described in Japanese Unexamined Patent Application Publication No. 2018-69435 (JP 2018-69435 A). The first tool 240F and the second tool 240B have equivalent shapes. The first tool 240F is arranged so that a rake face 243F of the first tool edge 241F is oriented to one side in a direction of an axis L of the gear cutter 240 (upper side in FIG. 9). The second tool 240B is arranged so that a rake face 243B of the second tool edge 241B is oriented to the other side in the direction of the axis L of the gear cutter 240 (lower side in FIG. 9). The collar 244 is formed into a cylindrical shape, and couples the first tool 240F and the second tool 240B so that the first tool 240F and the second tool 240B are rotatable together.

Figure 10A:
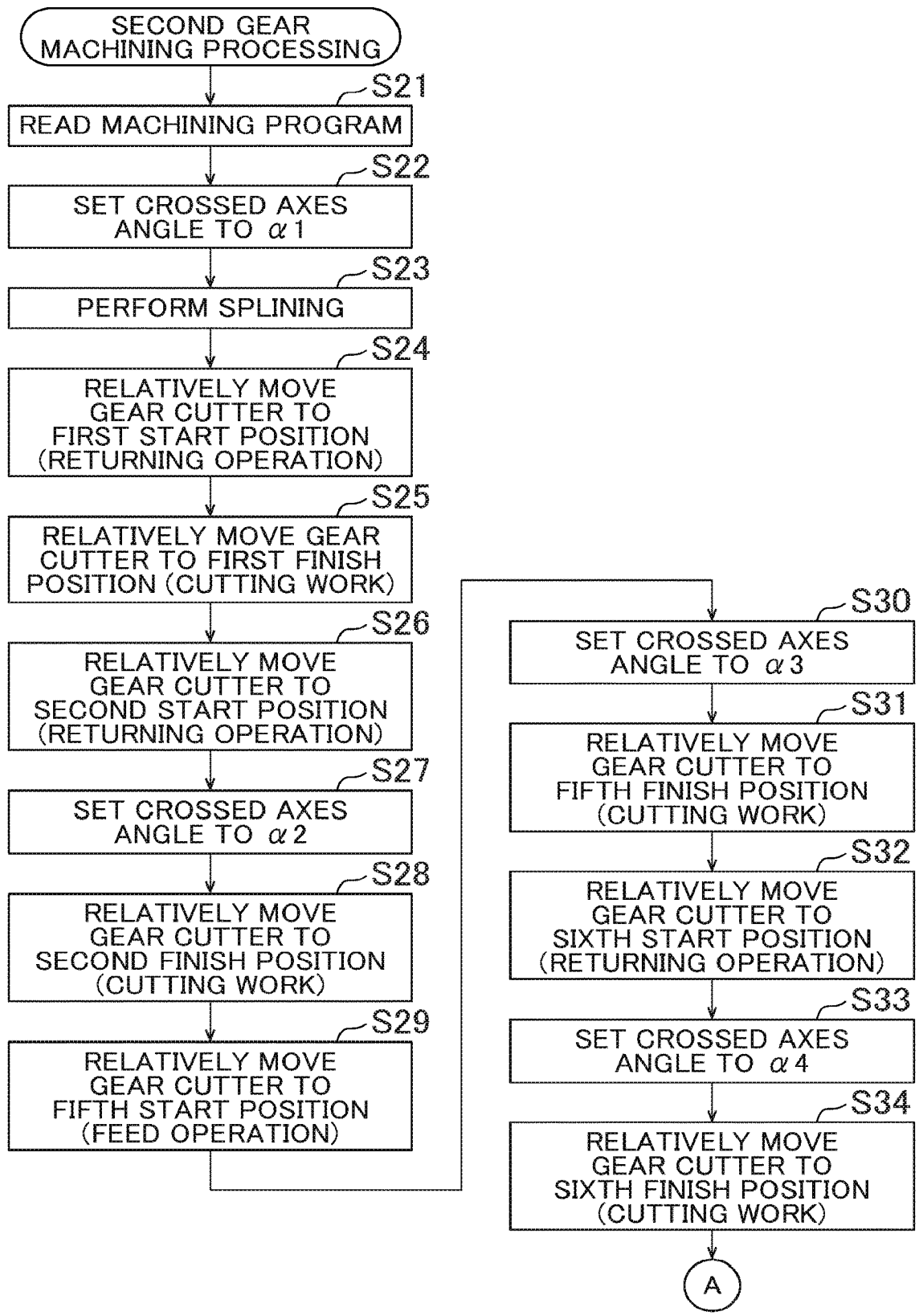
FIG. 10A is a first flowchart illustrating second gear machining processing to be executed by the machining control unit.

Next, second gear machining processing to be executed by the machining control unit 100 is described with reference to flowcharts illustrated in FIG. 10A and FIG. 10B. Processing of S21 to S28 in the second gear machining processing is identical to the processing of S1 to S8 in the gear machining processing described in the first embodiment, and therefore description of the processing is omitted. In the processing of S23, S25, and S28, cutting work is performed by using the first tool 240F.

Figure 11:
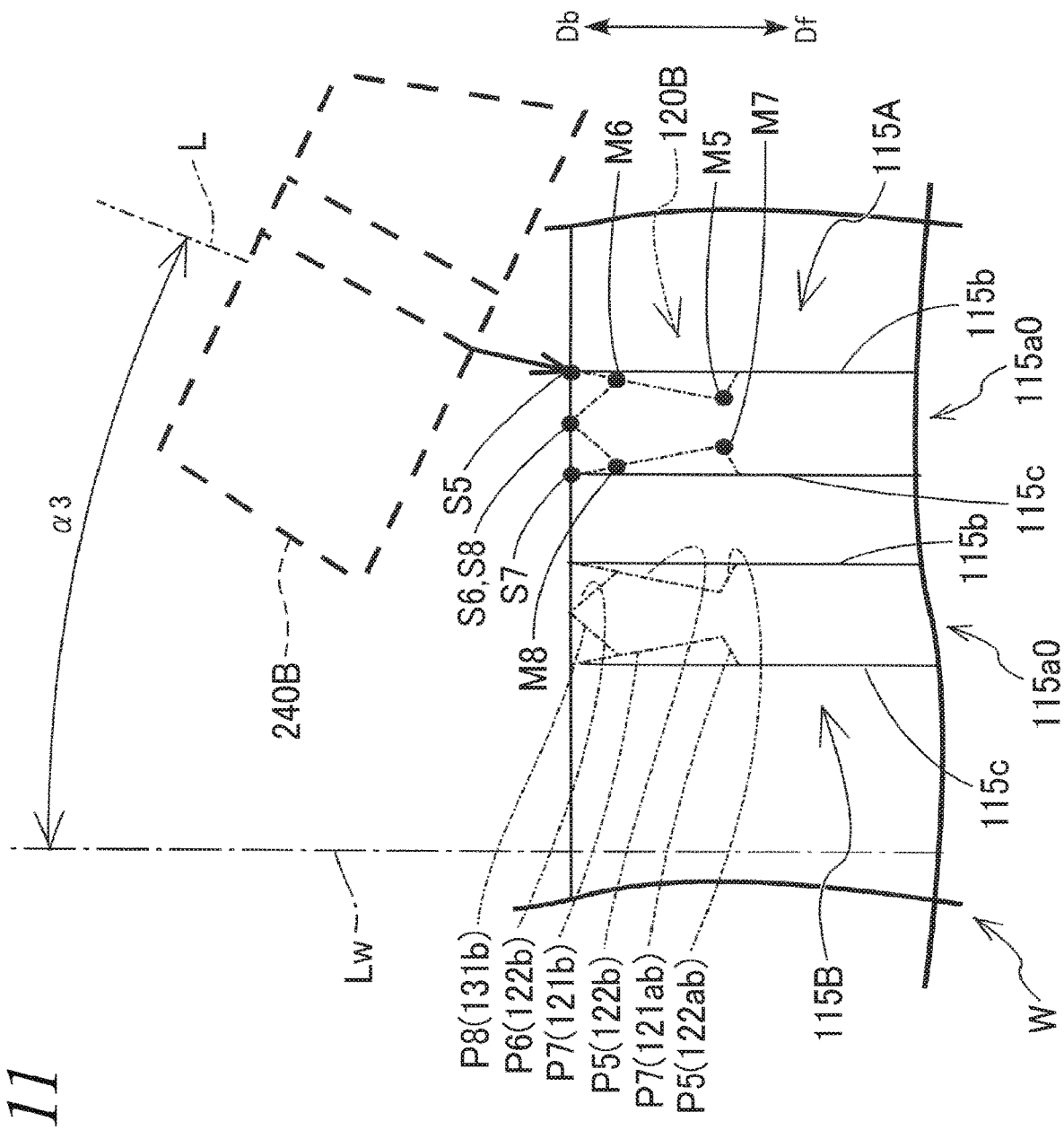
FIG. 11 is a view schematically illustrating a relative position of the gear cutter to the workpiece, and also illustrating a state before cutting work for a right back tapered tooth flank is started.
Figure 12:
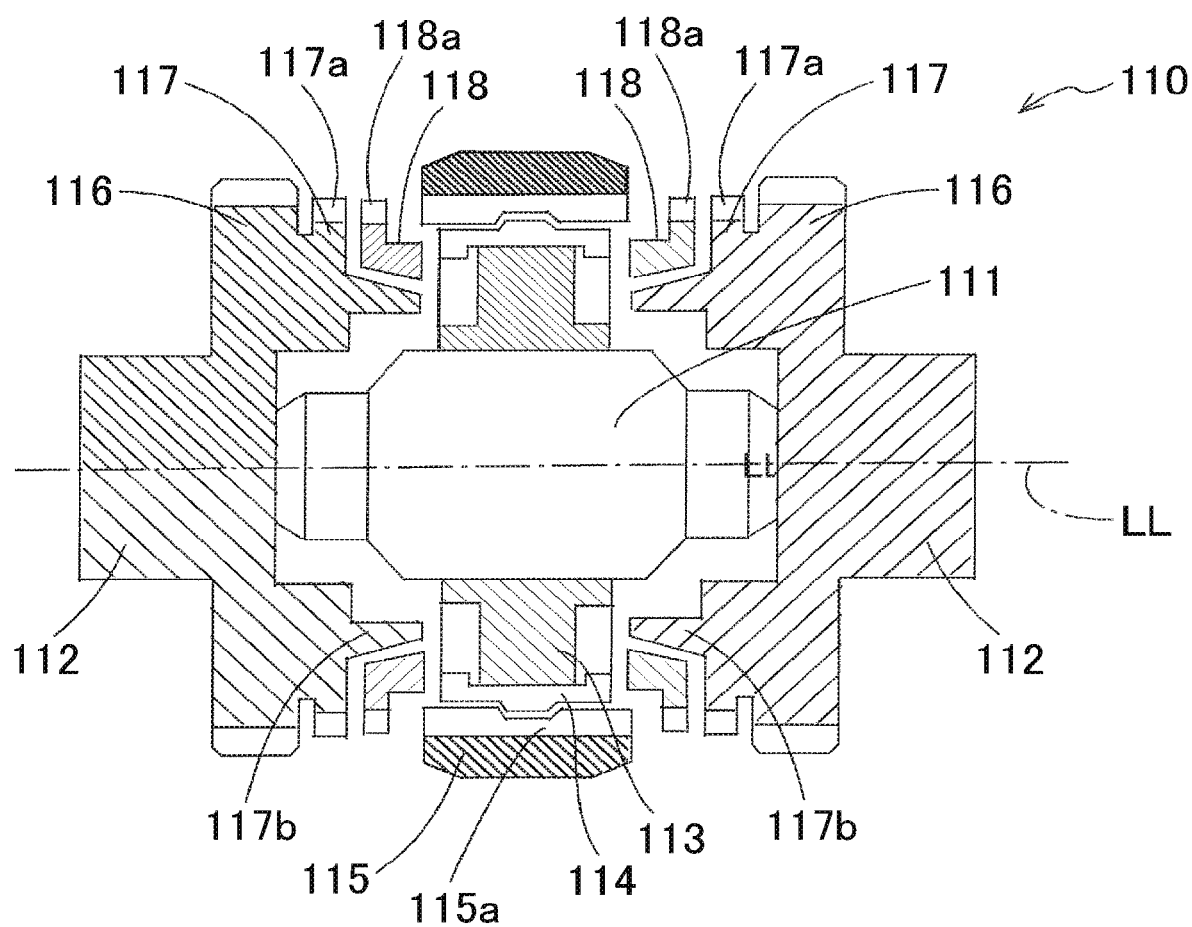
FIG. 12 is a sectional view illustrating a synchromesh mechanism including a sleeve.
Figure 13A:
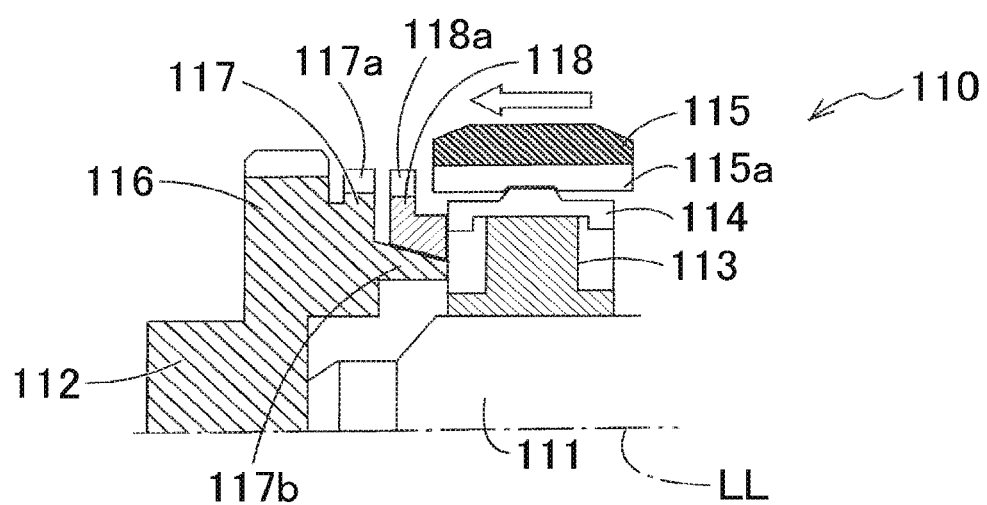
FIG. 13A is a sectional view illustrating a state before the synchromesh mechanism illustrated in FIG. 12 starts to operate.
Figure 13B:
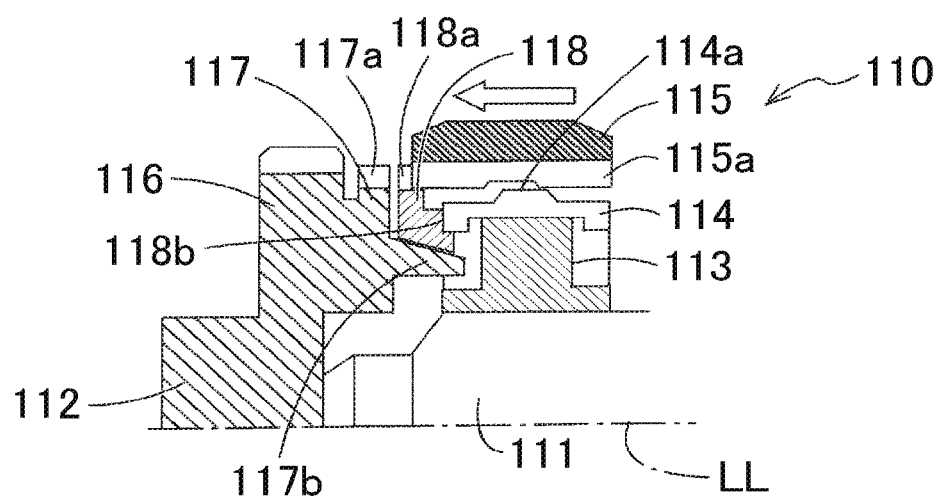
FIG. 13B is a sectional view illustrating a state in which the synchromesh mechanism illustrated in FIG. 12 is operating.
Figure 13C:
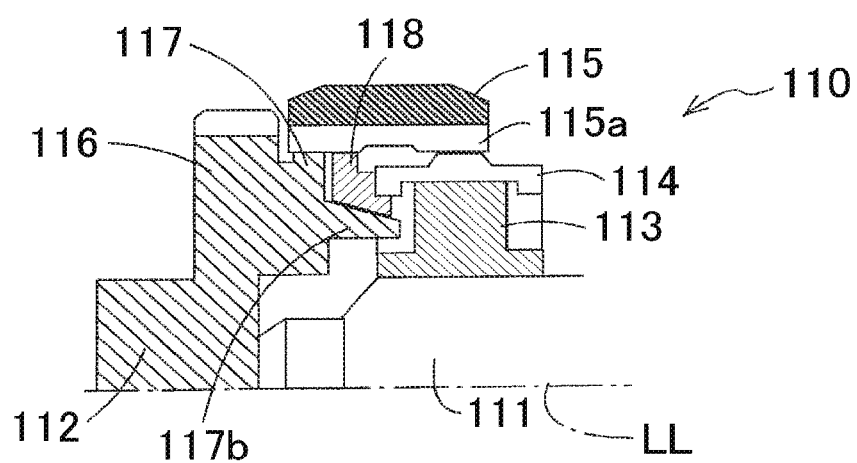
FIG. 13C is a sectional view illustrating a state after the synchromesh mechanism illustrated in FIG. 12 completes operating.
Figure 14:
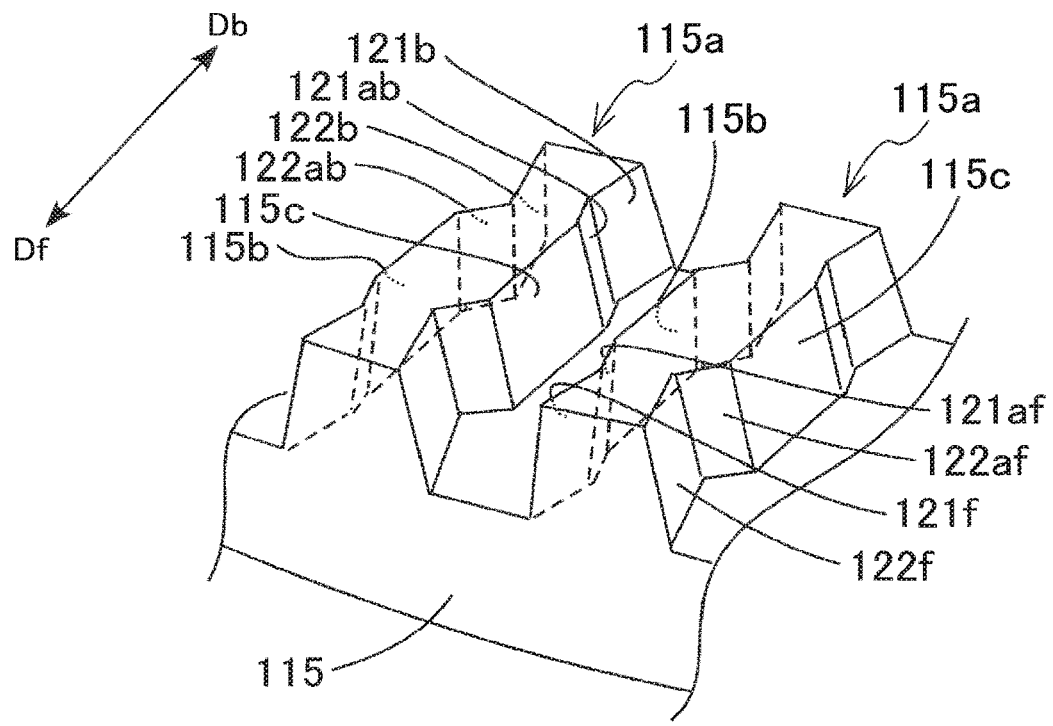
FIG. 14 is a perspective view illustrating gear slip preventing portions of the sleeve.
Figure 15:
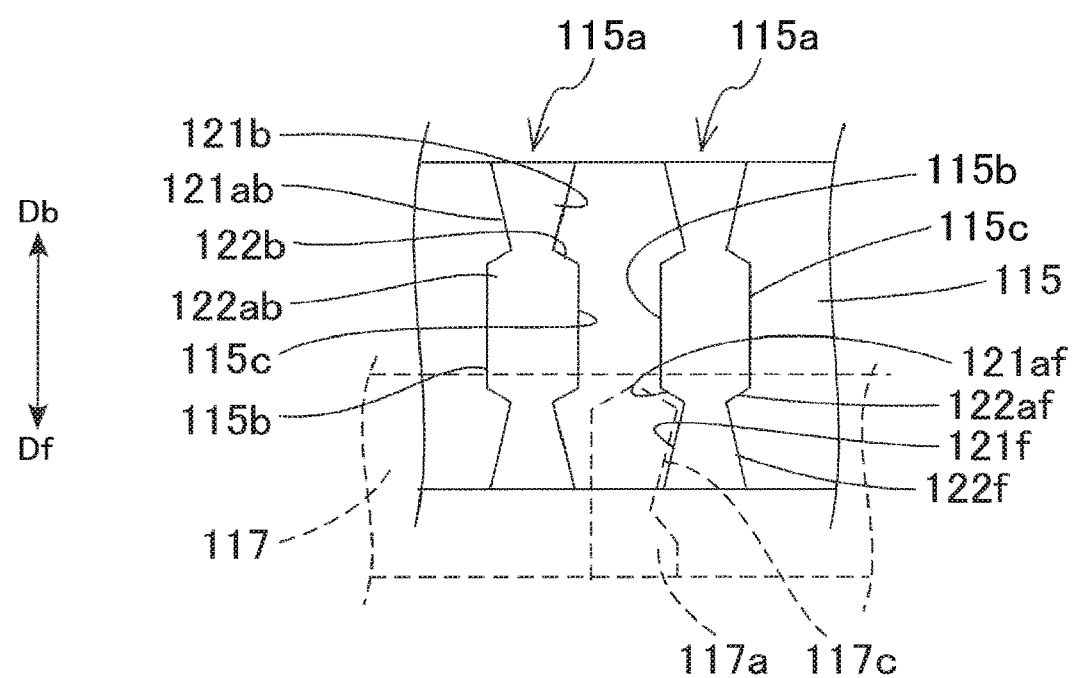
FIG. 15 is a view schematically illustrating a state of the gear slip preventing portions of the sleeve illustrated in FIG. 14 in the radial direction.

After the processing of S28, the machining control unit 100 moves the gear cutter 240 to the other rotation axis side Db of the workpiece W by performing a feed operation from the one rotation axis side Df to the other rotation axis side Db (S29). Specifically, as illustrated in FIG. 11, the machining control unit 100 relatively moves the gear cutter 240 from the second finish position to a fifth start position. The second finish position is the finish position of the feed operation when the right front chamfered tooth flank 132$f$ is formed. The fifth start position is a start position of a feed operation when a right back tapered tooth flank 122$b$ is formed.

After the processing of S29, the machining control unit 100 sets the crossed axes angle to α3 at the fifth start position (S30). Then, the machining control unit 100 relatively moves the cutting point C along a fifth path P5 by performing a feed operation from the other rotation axis side Db to the one rotation axis side Df. Thus, the right back tapered tooth flank 122$b$ and a right back subordinate tooth flank 122$ab$ are formed by cutting work (S31).

After the processing of S31, the machining control unit 100 performs a returning operation from the one rotation axis side Df to the other rotation axis side Db (S32). In the processing of S32, the machining control unit 100 relatively moves the gear cutter 240 from a fifth finish position to a sixth start position. The fifth finish position is a finish position of the feed operation when the right back tapered tooth flank 122$b$ is formed. The sixth start position is a start position of a feed operation when a right back chamfered tooth flank 132$b$ is formed.

After the processing of S32, the machining control unit 100 changes the crossed axes angle to α4 at the sixth start position (S33). After the processing of S33, the machining control unit 100 relatively moves the cutting point C along a sixth path P6 by performing a feed operation from the other rotation axis side Db to the one rotation axis side Df. Thus, the right back chamfered tooth flank 132$b$ is formed (S34).

Figure 10B:
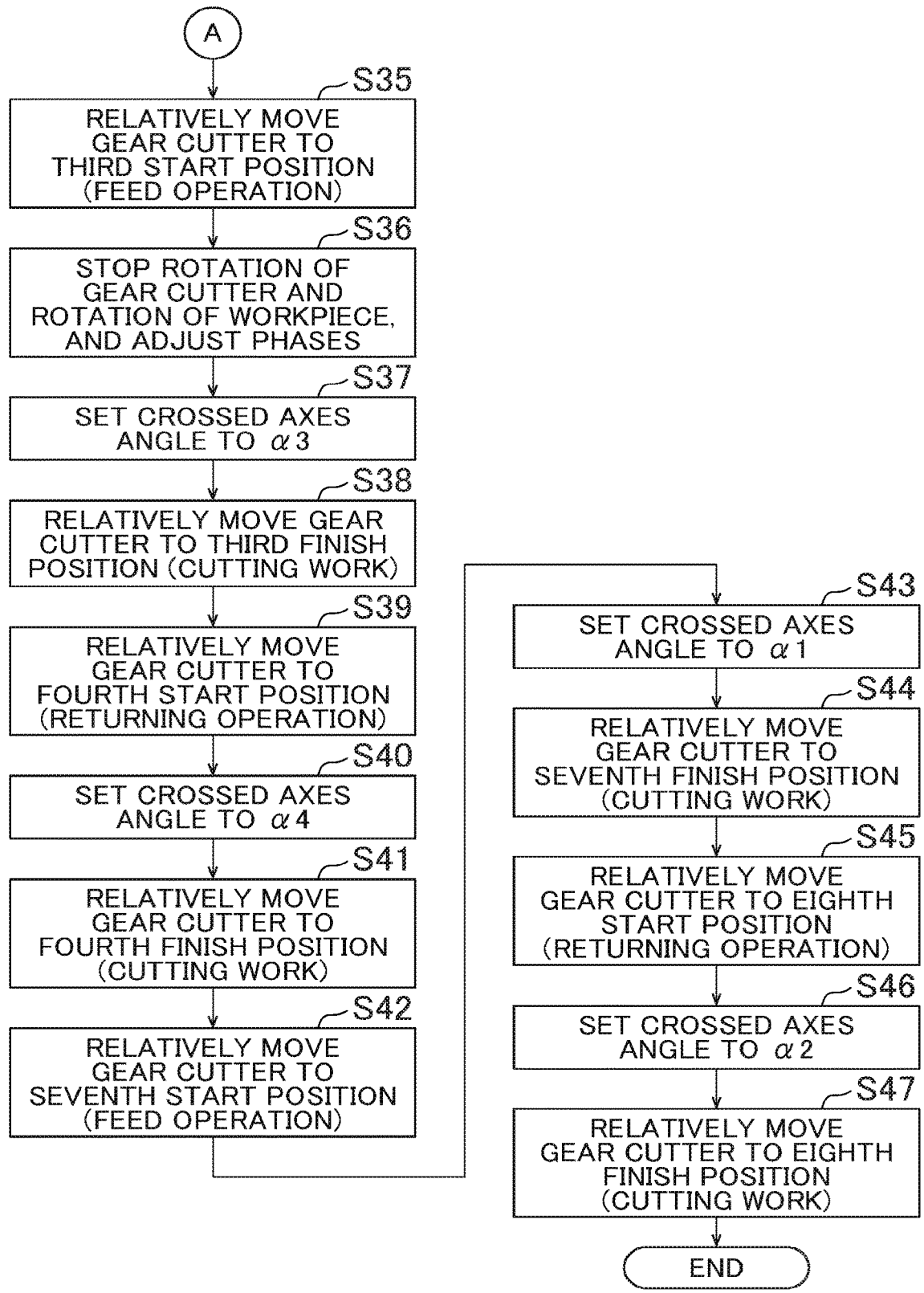
FIG. 10B is a second flowchart illustrating the second gear machining processing to be executed by the machining control unit.

As illustrated in FIG. 10B, after the processing of S34, the machining control unit 100 relatively moves the gear cutter 240 from a sixth finish position to the third start position (S35). The sixth finish position is a finish position of the feed operation when the right back chamfered tooth flank 132$b$ is formed. The third start position is the start position of the feed operation when the left front tapered tooth flank 121$f$ is formed. Then, the machining control unit 100 adjusts the phases of the spline teeth 115$a$0 formed on the workpiece W and the first tool edges 241F of the gear cutter 240 in a state in which the rotation of the workpiece W and the rotation of the gear cutter 240 is temporarily stopped (S36). Then, the machining control unit 100 proceeds to processing of S37.

Processing of S37 to S41 is identical to the processing of S11 to S15 in the gear machining processing described in the first embodiment, and therefore description of the processing is omitted. In the processing of S38 and S41, cutting work is performed by using the first tool 240F.

After the processing of S41, the machining control unit 100 moves the gear cutter 240 to the other rotation axis side Db of the workpiece W by performing a feed operation from the one rotation axis side Df to the other rotation axis side Db (S42). At this time, the machining control unit 100 relatively moves the gear cutter 240 from a fourth finish position to a seventh start position. The fourth finish position is a finish position of the feed operation when the left front chamfered tooth flank 131$f$ is formed. The seventh start position is a start position of a feed operation when a left back tapered tooth flank 121$b$ is formed.

After the processing of S42, the machining control unit 100 sets the crossed axes angle to α1 at the seventh start position (S43). Then, the machining control unit 100 relatively moves the cutting point C along a seventh path P7 by performing a feed operation from the other rotation axis side Db to the one rotation axis side Df. Thus, the left back tapered tooth flank 121$b$ and a left back subordinate tooth flank 121$ab$ are formed by cutting work (S44).

After the processing of S44, the machining control unit 100 performs a returning operation from the one rotation axis side Df to the other rotation axis side Db (S45). In the processing of S45, the machining control unit 100 relatively moves the gear cutter 240 from a seventh finish position to an eighth start position. The seventh finish position is a finish position of the feed operation when the left back tapered tooth flank 121$b$ is formed. The eighth start position is a start position of a feed operation when a left back chamfered tooth flank 131$b$ is formed.

After the processing of S45, the machining control unit 100 sets the crossed axes angle to α2 at the eighth start position (S46). After the processing of S46, the machining control unit 100 relatively moves the cutting point C along an eighth path P8 by performing a feed operation from the other rotation axis side Db to the one rotation axis side Df. Thus, the left back chamfered tooth flank 131$b$ is formed by cutting work (S47). Then, this processing is finished.

As described above, the gear machining apparatus 1 forms the gear slip preventing portions 120F and 120B by using the gear cutter 240 including the first tool 240F and the second tool 240B. Thus, the cycle time can be reduced.

When the gear slip preventing portions 120F and 120B are formed by using the gear cutter 240, the gear machining apparatus 1 collectively forms the tooth flanks (right front tapered tooth flank 122$f$, right front chamfered tooth flank 132$f$, right back tapered tooth flank 122$b$, and right back chamfered tooth flank 132$b$) on the right face 115B by cutting work. Thus, the gear machining apparatus 1 can form all the tooth flanks on the right face 115B without changing the rotation directions of the workpiece W and the gear cutter 240. The gear machining apparatus 1 forms the tooth flanks on the left face 115A after all the tooth flanks are formed on the right face 115B.

During the returning operation, the gear machining apparatus 1 can adjust the phases of the workpiece W and the gear cutter 240 while keeping a state in which the workpiece W and the gear cutter 240 rotate. The rotation of the workpiece W and the rotation of the gear cutter 240 need not be stopped if the rotation directions of the workpiece W and the gear cutter 240 need not be changed. The gear machining apparatus 1 collectively performs all the operations of cutting work for the right face 115B, and then collectively performs all the operations of cutting work for the left face 115A. Therefore, the rotation of the workpiece W and the rotation of the gear cutter 240 are stopped only once. Thus, the gear machining apparatus 1 can reduce the cycle time.

The present invention has been described above based on the embodiments, but is not limited to the embodiments described above. It can easily be understood that various modifications may be made without departing from the spirit of the present invention. In the embodiments described above, the present invention is applied to the case where the gear slip preventing portions 120F and 120B are formed on the spline teeth 115a0, but the present invention is also applicable to cases other than the case where the gear slip preventing portions 120F and 120B are formed.

What is claimed is:

1. A gear machining apparatus configured to perform cutting work for workpiece and generate a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece,
   the gear having a plurality of teeth each having one face including:
      a first tooth flank; and
      a second tooth flank having a helix angle different from a helix angle of the first tooth flank,
   the gear machining apparatus comprising a machining control unit configured to control rotation of the workpiece and rotation of the gear cutter, and control the feed operation of the gear cutter relative to the workpiece, wherein
   a start position of the feed operation when the first tooth flank is formed is defined as a first start position, a finish position of the feed operation when the first tooth flank is formed is defined as a first finish position, and a start position of the feed operation when the second tooth flank is formed is defined as a second start position,
   a position where the gear cutter cuts the one face is defined as a cutting point, the cutting point when the cutting work is started is defined as a start point, and the cutting point when the gear cutter is fed by a predetermined feed amount from the start point is defined as a movement point,
   the cutting point when the gear cutter is fed by the predetermined feed amount from the start point while the workpiece and the gear cutter rotate in a predetermined reference synchronous rotation state is defined as a reference movement point,
   a phase shift angle to one side in a circumferential direction of the workpiece, which is set to shift a phase of the movement point from a phase of the reference movement point when the gear cutter is fed by the predetermined feed amount from the start point is defined as a correction angle,
   a phase shift angle of the second start position from the first finish position to the one side in the circumferential direction of the workpiece is defined as a first angle, and
   the machining control unit is configured to set the correction angle to the first angle when the cutting work for the second tooth flank is started after the cutting work for the first tooth flank is finished, and move the gear cutter from the first finish position to the second start position while rotating the workpiece and the gear cutter.

2. The gear machining apparatus according to claim 1, wherein the machining control unit is configured to shift the phase of the movement point from the phase of the reference movement point by feeding the gear cutter by the predetermined feed amount from the start point while rotating the workpiece and the gear cutter at a rotation speed ratio different from a rotation speed ratio in a reference synchronous rotation state in which the workpiece and the gear cutter rotate synchronously.

3. The gear machining apparatus according to claim 2, wherein the machining control unit is configured to compute the rotation speed ratio between the workpiece and the gear cutter when the gear cutter is fed by the predetermined feed amount from the start point based on a distance between the first finish position and the second start position in the direction of the axis of the workpiece and based on the correction angle.

4. The gear machining apparatus according to claim 1, wherein
   a phase shift angle of the first finish position from the first start position to the one side in the circumferential direction of the workpiece is defined as a second angle, and a phase shift angle of the second start position from the first start position to the one side in the circumferential direction of the workpiece is defined as a third angle, and
   the machining control unit is configured to set, as the first angle, an angle obtained by subtracting the second angle from the third angle.

5. The gear machining apparatus according to claim 1, wherein
   the other face of each of the plurality of teeth includes:
      a third tooth flank having a helix angle different from the helix angle of the first tooth flank; and
      a fourth tooth flank having a helix angle different from the helix angle of the third tooth flank,
   a start position of the feed operation when the third tooth flank is formed is defined as a third start position, a finish position of the feed operation when the third tooth flank is formed is defined as a third finish position, and a start position of the feed operation when the fourth tooth flank is formed is defined as a fourth start position,
   a phase shift angle of the fourth start position from the third finish position to the other side in the circumferential direction of the workpiece is defined as a fourth angle, and
   the machining control unit is configured to:
      set a rotation direction of the workpiece and a rotation direction of the gear cutter to be identical between the cutting work for the first tooth flank and the cutting work for the second is sobs flank, and set, after the cutting work for the second tooth flank is finished, the rotation direction of the workpiece and the rotation direction of the gear cutter to be opposite to the rotation direction of the workpiece and the rotation direction of the gear cutter in the cutting work for the first tooth flank; and set the correction angle to the fourth angle when the cutting work for the fourth tooth flank is started after the cutting work for the third tooth flank is finished, and move the gear cutter from the third finish position to the fourth start position while rotating the workpiece and the gear cutter.

6. A gear machining method for performing cutting work for a workpiece and generating a gear by performing a feed operation of a gear cutter relative to the workpiece along a direction of an axis of the workpiece while synchronously rotating the gear cutter and the workpiece in a state in which an axis of the gear cutter is inclined with respect to a line parallel to the axis of the workpiece, wherein the gear has a plurality of teeth each having one face including:
a first tooth flank; and
a second tooth flank having a helix angle different from a helix angle of the first tooth flank,
a start position of the feed operation when the first tooth flank is formed is defined as a first start position, a finish position of the feed operation when the first tooth flank is formed is defined as a first finish position, and a start position of the feed operation when the second tooth flank is formed is defined as a second start position,
a position where the gear critter cuts the one face is defined as a cutting point, the cutting point when the cutting work is started is defined as a start point, and the cutting point when the gear cutter is fed by a predetermined feed amount from the start point is defined as a movement point,
the cutting point when the gear cutter is fed by the predetermined feed amount from the start point while the workpiece and the gear cutter rotate in a predetermined reference synchronous rotation state is defined as a reference movement point,
a phase shift angle to one side in a circumferential direction of the workpiece, which is set to shift a phase of the movement point from a phase of the reference movement point when the gear cutter is fed by the predetermined feed amount from the start point, is defined as a correction angle, and
a phase shift angle of the second start position from the first finish position to the one side in the circumferential direction of the workpiece is defined as a first angle,
the gear machining method comprising setting the correction angle to the first angle when the cutting work for the second tooth flank is started after the cutting work for the first tooth flank is finished, and moving the gear cutter from the first finish position to the second start position while rotating the workpiece and the gear cutter.

7. The gear machining method according to claim 6, further comprising shifting the phase of the movement point from the phase of the reference movement point by feeding the gear cutter by the predetermined feed amount from the start point while rotating the workpiece and the gear cutter at a rotation speed ratio different from a rotation speed ratio in a reference synchronous rotation state in which the workpiece and the gear cutter rotate synchronously.

8. The gear machining method according to claim 7, further comprising computing the rotation speed ratio between the workpiece and the gear cutter when the gear cutter is fed by the predetermined feed amount from the start point based on a distance between the first finish position and the second start position in the direction of the axis of the workpiece and based on the correction angle.

9. The gear machining method according to claim 6, wherein
a phase shift angle of the first finish position from the first start position to the one side in the circumferential direction of the workpiece is defined as a second angle, and a phase shift angle of the second start position from the first start position to the one side in the circumferential direction of the workpiece is defined as a third angle, and
the first angle is an angle obtained by subtracting the second angle from the third angle.

10. The gear machining method according to claim 6, wherein
the other face of each of the teeth includes:
a third tooth flank; and
a fourth tooth flank having a helix angle different from a helix angle of the third tooth flank,
a start position of the feed operation when the third tooth flank is formed is defined as a third start position, a finish position of the feed operation when the third tooth flank is formed is defined as a third finish position, a start position of the feed operation when the fourth tooth flank is formed is defined as a fourth start position, and a phase shift angle of the fourth start position from the third finish position to the other side in the circumferential direction of the workpiece is defined as a fourth angle, and
the gear machining method includes:
setting a rotation direction of the workpiece and a rotation direction of the gear cutter to be identical between the cutting work for the first tooth flank and the cutting work for the second tooth flank, and setting, after the cutting work for the second tooth flank is finished, the rotation direction of the workpiece and the rotation direction of the gear cutter to be opposite to the rotation direction of the workpiece and the rotation direction of the gear cutter in the cutting work for the first tooth flank; and
setting the correction angle to the fourth angle when the cutting work for the fourth tooth flank is started after the cutting work for the third tooth flank is finished, and moving the gear cutter from the third finish position to the fourth start position while rotating the workpiece and the gear cutter.

* * * * *